US011683826B2

(12) United States Patent
Kutz et al.

(10) Patent No.: US 11,683,826 B2
(45) Date of Patent: Jun. 20, 2023

(54) LOW POWER DOWNLINK CONTROL CHANNEL MONITORING

(71) Applicant: QUALCOMM Incorporated, San Diego, CA (US)

(72) Inventors: Gideon Shlomo Kutz, Ramat Hasharon (IL); David Yunusov, Holon (IL); Tal Oved, Modiin (IL); Shay Landis, Hod Hasharon (IL); Igor Gutman, Ramat Gan (IL); Ran Berliner, Kfar-Aviv (IL)

(73) Assignee: QUALCOMM INCORPORATED, San Diego, CA (US)

( * ) Notice: Subject to any disclaimer, the term of this patent is extended or adjusted under 35 U.S.C. 154(b) by 98 days.

(21) Appl. No.: 16/659,346

(22) Filed: Oct. 21, 2019

(65) Prior Publication Data

US 2021/0120560 A1 Apr. 22, 2021

(51) Int. Cl.
*H04L 1/00* (2006.01)
*H04W 72/542* (2023.01)
(Continued)

(52) U.S. Cl.
CPC ......... *H04W 72/542* (2023.01); *H04L 1/0069* (2013.01); *H04W 24/08* (2013.01);
(Continued)

(58) Field of Classification Search
None
See application file for complete search history.

(56) References Cited

U.S. PATENT DOCUMENTS 10,644,914 B2  5/2020  Medles et al.
2005/0157638 A1*  7/2005  Maltsev ............. H04L 27/2608
370/203

(Continued)

FOREIGN PATENT DOCUMENTS

WO  WO-2015038043 A1  3/2015

OTHER PUBLICATIONS

Condo C., et al., "Design and Implementation of a Polar Codes Blind Detection Scheme", IEEE Transactions on Circuits and Systems II: Express Briefs, vol. 66, No. 6, Jun. 2019, pp. 943-947. DOI: 10.1109/TCSII.2018.2872653.

(Continued)

*Primary Examiner* — Jason E Mattis
*Assistant Examiner* — Bao G Nguyen
(74) *Attorney, Agent, or Firm* — Holland & Hart LLP; Nerrie M. Zohn

(57) ABSTRACT

Methods, systems, and devices for wireless communications are described. In some systems, a user equipment (UE) may monitor sets of decoding candidates over a search space in each monitoring occasion to detect downlink control transmissions. Such a monitoring process may be resource intensive. To reduce the processing power involved in monitoring the control channel, a UE may measure resources associated with the downlink control channel to obtain a quality metric. The UE may compare the quality metric to one or more thresholds and may perform a decoding process on a set of configured decoding candidates for the downlink control channel based on the comparing. In some cases, if the channel quality is relatively good, the UE may perform a list decoding process using a list size less than a maximum list size or may perform partial data tone processing to reduce the processing complexity for some of the decoding candidates.

30 Claims, 13 Drawing Sheets

(51) Int. Cl.
  *H04W 24/08* (2009.01)
  *H04W 24/10* (2009.01)
  *H04W 72/044* (2023.01)
  *H04W 72/23* (2023.01)
(52) U.S. Cl.
  CPC ....... *H04W 24/10* (2013.01); *H04W 72/0466* (2013.01); *H04W 72/23* (2023.01)

(56) References Cited

U.S. PATENT DOCUMENTS

| | | |
|---|---|---|
| 2011/0176635 A1 | 7/2011 | Hochwald et al. |
| 2014/0064215 A1* | 3/2014 | Wu ................. H04L 5/0053 370/329 |
| 2014/0086063 A1* | 3/2014 | Wu ................. H04L 5/0053 370/241 |
| 2016/0227525 A1 | 8/2016 | Werner et al. |
| 2017/0033807 A1 | 2/2017 | Kim et al. |
| 2017/0126355 A1* | 5/2017 | Reial ................. H04L 1/0009 |
| 2017/0181168 A1* | 6/2017 | Neuhaus ............. H04L 5/0057 |
| 2017/0366199 A1 | 12/2017 | Ge et al. |
| 2018/0176059 A1* | 6/2018 | Medles ............. H04L 27/2613 |
| 2018/0212627 A1* | 7/2018 | Hosseini ............ H04L 1/1819 |
| 2018/0227886 A1 | 8/2018 | Chou et al. |
| 2018/0323810 A1 | 11/2018 | Sarkis et al. |
| 2019/0052487 A1 | 2/2019 | Shelby et al. |
| 2019/0190642 A1 | 6/2019 | Medina Acosta et al. |
| 2019/0313388 A1* | 10/2019 | Davydov ............ H04W 24/08 |
| 2020/0295786 A1* | 9/2020 | Palgy ................ H03M 13/3707 |
| 2021/0120560 A1* | 4/2021 | Kutz .................. H04W 72/042 |
| 2022/0061083 A1* | 2/2022 | Liu .................. H04W 72/1289 |

OTHER PUBLICATIONS

International Search Report and Written Opinion—PCT/US2020/056501—ISA/EPO—dated Feb. 11, 2021.

* cited by examiner

LOW POWER DOWNLINK CONTROL CHANNEL MONITORING

FIELD OF TECHNOLOGY

The following relates generally to wireless communications and more specifically to low power downlink control channel monitoring.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, grants may be sent to a UE on a control channel. The UE may be configured to monitor candidates of the control channel in order to receive and decode control information. For example, in an NR system, the UE may search for grants in search space sets using a decoding process, which may be referred to as a "blind" decoding process. However, such a blind decoding process may result in significant processing complexity and power consumption at the UE. Maintaining blind decoding performance while reducing processing complexity or power consumption presents challenges in wireless communications systems.

SUMMARY

The essential features of the invention are defined by the independent claims. Particular embodiments of the invention are defined by the dependent claims. The described techniques relate to improved methods, systems, devices, and apparatuses that support low power downlink control channel monitoring. Generally, the described techniques provide for a user equipment (UE) to implement a processing scheme for monitoring candidates of a control channel in order to reduce power consumption and/or processing complexity. The UE may utilize the processing scheme to perform decoding processes for the control channel (e.g., a physical downlink control channel (PDCCH)) based on one or more quality metrics associated with channel conditions of the control channel. For example, the UE may generate one or more quality metrics based on channel measurements and may compare the quality metrics to one or more thresholds (e.g., thresholds associated with an aggregation level and/or a coding rate). In some cases, the UE may abort processing a decoding candidate or partially process the decoding candidate based on comparing the quality metrics to the thresholds (e.g., based on whether a quality metric satisfies or fails to satisfy a threshold). Additionally or alternatively, the UE may compare a quality metric to the one or more thresholds and may determine a list size (e.g., a successive cancellation (SC) list size) to use for the decoding process based on the comparison. By aborting processing for a decoding candidate, partially processing a decoding candidate, reducing a list size for decoding a decoding candidate, or performing some combination of these techniques, the UE may significantly reduce the processing overhead associated with monitoring the control channel.

A method for wireless communications at a UE is described. The method may include performing a measurement of resources associated with a downlink control channel to obtain a quality metric for the downlink control channel, comparing the quality metric to one or more thresholds, and performing a decoding process on one or more of a set of configured decoding candidates for the downlink control channel based on a result of the comparing.

An apparatus for wireless communications at a UE is described. The apparatus may include a processor, memory coupled with the processor, and instructions stored in the memory. The instructions may be executable by the processor to cause the apparatus to perform a measurement of resources associated with a downlink control channel to obtain a quality metric for the downlink control channel, compare the quality metric to one or more thresholds, and perform a decoding process on one or more of a set of configured decoding candidates for the downlink control channel based on a result of the comparing.

Another apparatus for wireless communications at a UE is described. The apparatus may include means for performing a measurement of resources associated with a downlink control channel to obtain a quality metric for the downlink control channel, comparing the quality metric to one or more thresholds, and performing a decoding process on one or more of a set of configured decoding candidates for the downlink control channel based on a result of the comparing.

A non-transitory computer-readable medium storing code for wireless communications at a UE is described. The code may include instructions executable by a processor to perform a measurement of resources associated with a downlink control channel to obtain a quality metric for the downlink control channel, compare the quality metric to one or more thresholds, and perform a decoding process on one or more of a set of configured decoding candidates for the downlink control channel based on a result of the comparing.

In some examples of the method, apparatuses, and non-transitory computer-readable medium described herein, the one or more thresholds include a first set of thresholds for a first aggregation level including a first subset of the set of configured decoding candidates and performing the decoding process may include operations, features, means, or instructions for performing a first decoding process for the first subset of the set of configured decoding candidates based on comparing the quality metric to the first set of thresholds for the first aggregation level.

In some examples of the method, apparatuses, and non-transitory computer-readable medium described herein, the quality metric may include a first quality metric, and the method, apparatuses, and non-transitory computer-readable medium described herein may further include operations, features, means, or instructions for comparing a second quality metric to a second set of thresholds for a second aggregation level including a second subset of the set of configured decoding candidates, where the second quality metric is obtained based on performing the measurement of resources associated with the downlink control channel, and performing a second decoding process for the second subset of the set of configured decoding candidates based on comparing the second quality metric to the second set of thresholds for the second aggregation level. Such operations, features, means, or instructions may result in more efficient and dynamic decoding processes, for example, due to enabling different code rates and thresholds for various aggregation levels.

In some examples of the method, apparatuses, and non-transitory computer-readable medium described herein, the first quality metric is different from the second quality metric. In some other examples of the method, apparatuses, and non-transitory computer-readable medium described herein, the first quality metric is the same as the second quality metric.

In some examples of the method, apparatuses, and non-transitory computer-readable medium described herein, a first list size of a channel decoder, a first number of iterations of the channel decoder, or a combination thereof for the first decoding process for the first aggregation level may be different from a second list size of the channel decoder, a second number of iterations of the channel decoder, or a combination thereof for the second decoding process for the second aggregation level. Such examples may result in more dynamic and accurate decoding, for example, due to implementing less processing complexity (e.g., a smaller list size) or enabling more reliable decoding (e.g., a larger list size) for different aggregation levels.

Some examples of the method, apparatuses, and non-transitory computer-readable medium described herein may further include operations, features, means, or instructions for selecting a coding rate for the first decoding process and the second decoding process based on comparing the first quality metric to the first set of thresholds for the first aggregation level, comparing the second quality metric to the second set of thresholds for the second aggregation level, or both, refraining from processing a first set of resource elements of the downlink control channel for the first aggregation level based at least in part on comparing the first quality metric to the first set of thresholds, wherein the selected coding rate is achieved by puncturing first symbols information for the downlink control channel associated with the first set of resource elements for the first aggregation level, where the first decoding process may be performed on the punctured first symbols information, refraining from processing a second set of resource elements of the downlink control channel for the second aggregation level based at least in part on comparing the second quality metric to the second set of thresholds, wherein the selected coding rate is achieved by puncturing second symbols information for the downlink control channel associated with the second set of resource elements for the second aggregation level, where the second decoding process may be performed on the punctured second symbols information. Such examples may enable more efficient communications. For instance, such examples may enable a wireless device to achieve a selected coding rate by puncturing symbol information, which may result in a lower processing overhead for decoding.

In some examples of the method, apparatuses, and non-transitory computer-readable medium described herein, the quality metric may include a first quality metric, and the method, apparatuses, and non-transitory computer-readable medium described herein may further include operations, features, means, or instructions for comparing the second quality metric to a second set of thresholds for a second aggregation level including a second subset of the set of configured decoding candidates, where the second quality metric is obtained based on performing the measurement of resources associated with the downlink control channel, and refraining from performing a second decoding process for the second subset of the set of configured decoding candidates based on comparing the second quality metric to the second set of thresholds for the second aggregation level. Such examples may enable enhanced power savings. For instance, refraining from performing a second decoding process (e.g., based on whether the second quality metric indicates a relatively low chance of successful decoding) which may result in reduced power consumption.

In some examples of the method, apparatuses, and non-transitory computer-readable medium described herein, the second quality metric fails to satisfy each threshold of the second set of thresholds for the second aggregation level.

In some examples of the method, apparatuses, and non-transitory computer-readable medium described herein, the measurement of resources associated with the downlink control channel may be performed during a first monitoring occasion. Some examples of the method, apparatuses, and non-transitory computer-readable medium described herein may further include operations, features, means, or instructions for performing, during a second monitoring occasion, an additional measurement of the resources associated with the downlink control channel to obtain an additional quality metric for the downlink control channel, comparing the additional quality metric to the one or more thresholds to obtain an additional result, and refraining from performing an additional decoding process on the set of configured decoding candidates for the downlink control channel based on the additional result. Refraining from performing the additional decoding process (e.g., based on whether the additional quality metric indicates a relatively low chance of successful decoding) may result in reduced power consumption in cases where the decoding operation has a low probability of success.

In some examples of the method, apparatuses, and non-transitory computer-readable medium described herein, the additional quality metric fails to satisfy each threshold of the one or more thresholds.

In some examples of the method, apparatuses, and non-transitory computer-readable medium described herein, performing the decoding process may include operations, features, means, or instructions for performing, using a channel decoder, a list decoding process for the downlink control channel using a maximum list size supported by the UE for the channel decoder based on the result of the comparing. Such examples may realize more reliable communications. For instance, using a maximum list size supported by the UE to perform the list decoding process may increase the chance of successful decoding.

In some examples of the method, apparatuses, and non-transitory computer-readable medium described herein, performing the decoding process may include operations, features, means, or instructions for selecting a coding rate for the decoding process based on the result of the comparing, refraining from processing one or more resource elements of the downlink control channel according to the selected coding rate, and puncturing symbol information for the downlink control channel associated with the one or more resource elements, where the decoding process may be performed on the punctured symbol information. Such examples may achieve reduced decoding overhead, for instance, due to puncturing symbol information and refraining from processing one or more resource elements (e.g., reduced processing complexity and increased power savings).

In some examples of the method, apparatuses, and non-transitory computer-readable medium described herein, the one or more thresholds include a set of thresholds, and where the coding rate may be selected from a set of supported coding rates based on the result of comparing the quality metric to the set of thresholds.

In some examples of the method, apparatuses, and non-transitory computer-readable medium described herein, the puncturing may be performed according to a puncturing pattern for the selected coding rate.

In some examples of the method, apparatuses, and non-transitory computer-readable medium described herein, the puncturing pattern may include a first puncturing pattern and the operations, features, means, or instructions may support receiving, via the downlink control channel, a downlink control information message conforming to a second puncturing pattern different from the first puncturing pattern and failing to decode the downlink control information message based on puncturing the symbol information according to the first puncturing pattern and the downlink control information message conforming to the second puncturing pattern.

In some examples of the method, apparatuses, and non-transitory computer-readable medium described herein, performing the decoding process may include operations, features, means, or instructions for selecting a list size for a channel decoder that may be less than a maximum list size supported by the UE for the channel decoder based on the result of the comparing and performing, using the channel decoder, a list decoding process for the downlink control channel using the selected list size. Such examples may realize one or more advantages. For example, using a list size less than a maximum list size may reduce the processing overhead and/or the power consumption due to less processing complexity at the channel decoder, while maintaining reliable communications (e.g., in relatively good channel conditions).

In some examples of the method, apparatuses, and non-transitory computer-readable medium described herein, the selected list size may be one. Some examples of the method, apparatuses, and non-transitory computer-readable medium described herein may further include operations, features, means, or instructions for receiving, via the downlink control channel, a distorted downlink control information message, where the distorted downlink control information message includes an inverted encoded bit for a most reliable bit for polar decoding of the distorted downlink control information message and failing to decode the distorted downlink control information message based on performing the list decoding process using the selected list size of one and the distorted downlink control information message including the inverted encoded bit for the most reliable bit for polar decoding.

In some examples of the method, apparatuses, and non-transitory computer-readable medium described herein, the quality metric may be based on a channel estimation for resource elements of the downlink control channel, a noise covariance of the resource elements of the downlink control channel, a set of resource elements in a decoding candidate for the decoding process, or a combination thereof. Such examples may enable relatively more accurate estimations of channel conditions, which may result in enhanced decoding success and reduced processing complexity for one or more decoding processes.

In some examples of the method, apparatuses, and non-transitory computer-readable medium described herein, the quality metric includes a signal-to-noise ratio (SNR) for the downlink control channel, a signal-to-interference-plus-noise ratio (SINR) for the downlink control channel, a spectral efficiency for the downlink control channel, or a combination thereof.

In some examples of the method, apparatuses, and non-transitory computer-readable medium described herein, performing the measurement of the resources may include operations, features, means, or instructions for processing one or more pilot tones of the downlink control channel, where the quality metric may be obtained based on processing the one or more pilot tones.

DETAILED DESCRIPTION

Figure 1:
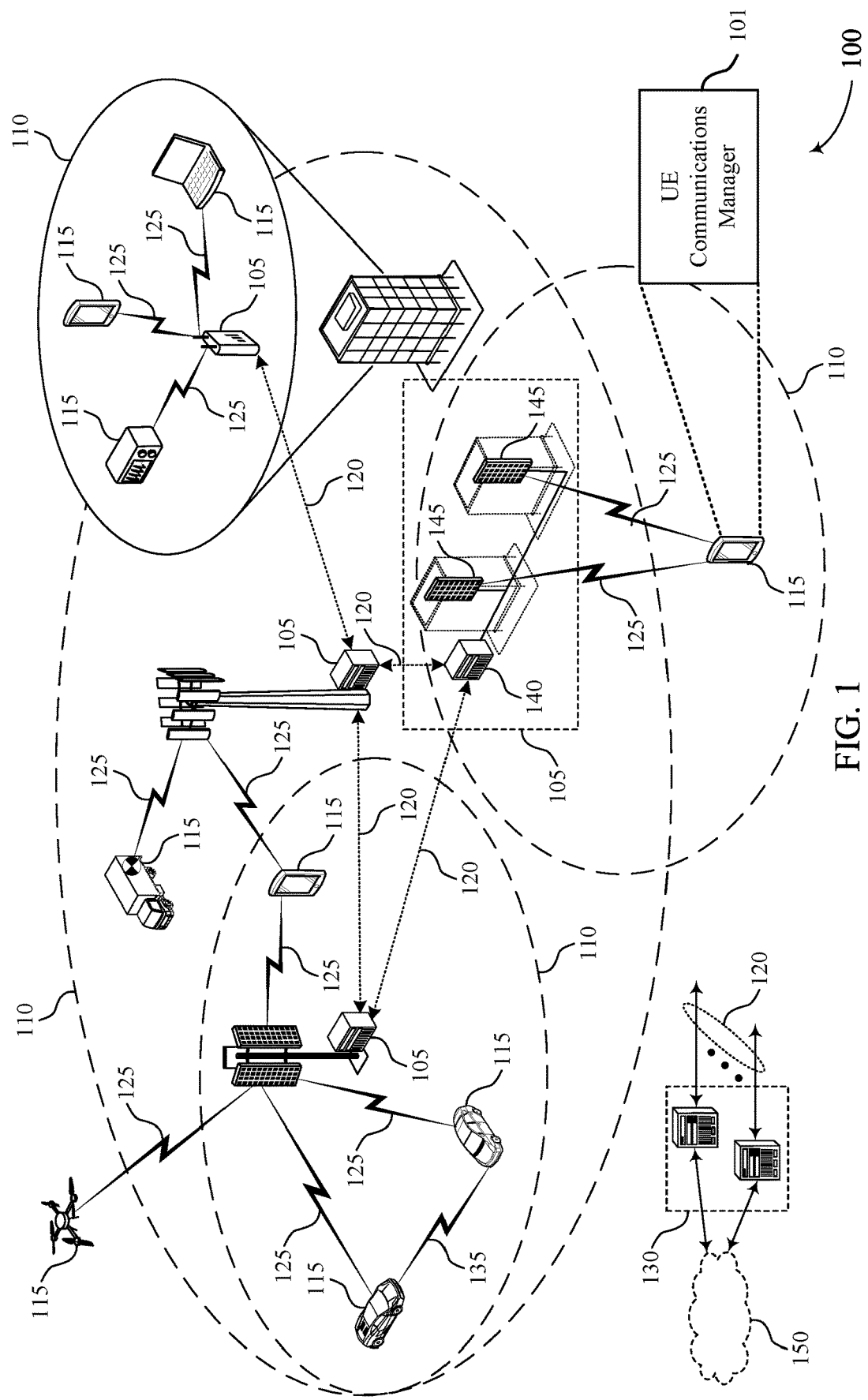
FIGS. 1 and 2 illustrate examples of wireless communications systems that support low power downlink control channel monitoring in accordance with aspects of the present disclosure.

In some wireless communications systems, such as Long Term Evolution (LTE) or new radio (NR) systems, grants may be sent to a user equipment (UE) on a control channel (e.g., a physical downlink control channel (PDCCH)). The UE may be configured to "wake up" for monitoring occasions of the control channel in order to receive and decode PDCCH candidates that may contain control information (e.g., downlink control information (DCI)) for the UE. Such monitoring may be referred to as blind decoding (e.g., because the UE may perform decoding on signals in monitoring occasions that may or may not include control information). In some cases, a base station transmitting the DCI may encode the information in the form of code blocks using an error correcting code. An error correcting code may introduce redundancy in the code blocks so that transmission errors may be detected and/or corrected. Some examples of encoding algorithms with error correcting codes include convolutional codes (CCs), low-density parity-check (LDPC) codes, and polar codes. A polar code is an example of a linear block error correcting code and has been shown to approach the theoretical channel capacity as the code length increases. The UE may search for polar encoded grants in a decoding process. For example, the UE may search for one of several DCI formats in search space sets that include multiple aggregation levels. However, such a decoding process may result in significant processing complexity and power consumption at the UE, for example, when the UE performs decoding on a decoding candidate that does not include DCI for the UE, among other examples.

According to some aspects, a wireless device may implement techniques to refrain from processing (e.g., decoding) or partially processing decoding candidates of a control channel. For example, the UE may determine channel conditions using channel estimation procedures (e.g., measurement of resources associated with a downlink control channel, such as pilot tone or reference signal processing, noise covariance estimation, signal-to-noise ratio (SNR) measurement, spectral efficiency measurement, channel estimation, or some combination of these or other relevant processes, measurements, and estimations). The UE may calculate a quality metric based on the measured channel conditions and may compare the quality metric to one or more thresholds (e.g., pre-configured thresholds) to determine how to process the decoding candidates. The thresholds may be aggregation level-specific, coding rate-specific, or both for the decoding process.

In some examples, the UE may refrain from processing a resource based on whether the quality metric satisfies a threshold. For example, the UE may determine that the quality metric is less than a threshold and may abort processing of a decoding candidate (e.g., because there may be a relatively low chance of success to decode the candidate due to relatively "poor" channel conditions). Additionally or alternatively, the UE may determine that the quality metric satisfies one or more thresholds. The UE may perform partial data tone processing based on the satisfied thresholds. For example, the UE may determine to partially process a decoding candidate by puncturing (e.g., refraining from processing) particular tones and puncturing (e.g., zeroing) corresponding input log-likelihood ratios (LLRs) for polar decoding due to relatively "good" channel conditions. The UE may implement multiple thresholds corresponding to multiple puncturing patterns and coding rates (e.g., based on the channel conditions and the aggregation levels). Furthermore, in some examples, the UE may select one or more parameters of the decoding process (e.g., a polar decoding process) based on whether a quality metric (e.g., a quality metric associated with a coding rate index) satisfies a threshold. For example, the UE may determine a decoding list size, such as a successive cancellation (SC) list size for polar decoding, based on a quality metric being greater than a threshold. In some cases, the UE may select a relatively small SC list size 'L' in order to reduce processing complexity and power consumption when the smaller list size is likely to correctly decode a decoding candidate if DCI is present in the decoding candidate. The UE may implement a first SC list size (e.g., L=1) if the quality metric satisfies (e.g., is greater than or equal to) the threshold and a second SC list size (e.g., a default or maximum list size, such as L=8) if the quality metric does not satisfy the threshold.

Aspects of the disclosure are initially described in the context of wireless communications systems. Aspects of the disclosure are also described in the context of device diagrams, process flows, and decoding trees. Aspects of the disclosure are further illustrated by and described with reference to apparatus diagrams, system diagrams, and flowcharts that relate to low power downlink control channel monitoring.

FIG. 1 illustrates an example of a wireless communications system 100 that supports low power downlink control channel monitoring in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element (RE) may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. For example, a first aggregation level for a first decoding candidate may correspond to a first number of CCEs associated with encoded information for the first decoding candidate, while a second aggregation level for a second decoding candidate may correspond to a second number of CCEs associated with encoded information for the second decoding candidate. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems 100, a UE 115 may be configured to "wake up" (e.g., power up or enable processing circuitry and monitor a downlink control channel while "awake") for monitoring occasions of a PDCCH in order to receive and decode PDCCH candidates that may contain control information (e.g., DCI) for the UE 115. For example, the UE 115 may search for polar encoded grants in search spaces associated with one or more aggregation levels, and the search spaces may include the PDCCH candidates. For example, the UE 115 may search each configured search space for control information intended for the UE 115 (e.g., either UE-specific or common DCI) in a decoding process. However, such a decoding process may result in significant processing complexity and power consumption at the UE 115, for example, when the UE 115 performs decoding on a search space or decoding candidate that does not include DCI for the UE 115, among other examples.

Accordingly, the UE 115 may implement techniques to refrain from processing or partially processing decoding candidates of a control channel. For example, the UE 115 may determine one or more quality metrics based on channel conditions of the control channel. The UE 115 may compare a quality metric to one or more quality metric thresholds to determine the decoding scheme for processing the decoding candidate. In some examples, the UE 115 may refrain from processing a resource (e.g., the PDCCH candidate) based on whether the quality metric satisfies a threshold. For example, the UE 115 may determine that the quality metric is less than a threshold and may abort processing of a decoding candidate (e.g., because there may be a relatively low chance of success to decode the candidate due to relatively "poor" channel conditions). In some cases, the UE 115 may abort the decoding process for the decoding candidate prior to starting a decoding process, such as a list decoding process, or during the decoding process.

Additionally or alternatively, the UE 115 may determine that the quality metric satisfies one or more thresholds. The UE 115 may perform partial data tone processing based on the satisfied thresholds. For example, the UE 115 may determine to partially process a decoding candidate by puncturing (e.g., refraining from processing) particular tones and puncturing (e.g., zeroing) corresponding input LLRs for polar decoding due to relatively "good" channel conditions (e.g., a relatively high chance of success to decode the candidate at a higher effective coding rate than the transmitted PDCCH candidate). In some examples, the UE 115 may determine whether a quality metric satisfies a threshold and may use a decoding parameter (e.g., an SC list size '1' when the decoding process is a polar decoding process) based on the quality metric satisfying or failing to satisfy the threshold. Performing decoding (e.g., using partial tone processing, a reduced list size, or both) based on the quality metric may support the UE 115 lowering power consumption for PDCCH monitoring at a demodulator, a channel decoder (e.g., a polar decoder), or both.

In some cases, the UE 115 may support modifying the DCI detection strategy based on the quality metric in conjunction with one or more other power reduction techniques. For example, the UE 115 may detect the existence of PDCCH signals by correlating on pilot signals. Additionally or alternatively, the UE 115 may apply an abort criteria for decoding based on partial polar processing. These or other techniques may support the UE 115 reducing processing power for monitoring the downlink control channel for DCI sent to the UE 115.

One or more of the UEs 115 may include a UE communications manager 101, which may perform a measurement of resources associated with a downlink control channel to obtain a quality metric for the downlink control channel, compare the quality metric to one or more thresholds, and perform a decoding process on one or more of a set of configured decoding candidates for the downlink control channel based on a result of the comparing. The UE communications manager 101 may be an example of a communications manager 715, 815, 905, or 1010 as described herein.

Figure 2:
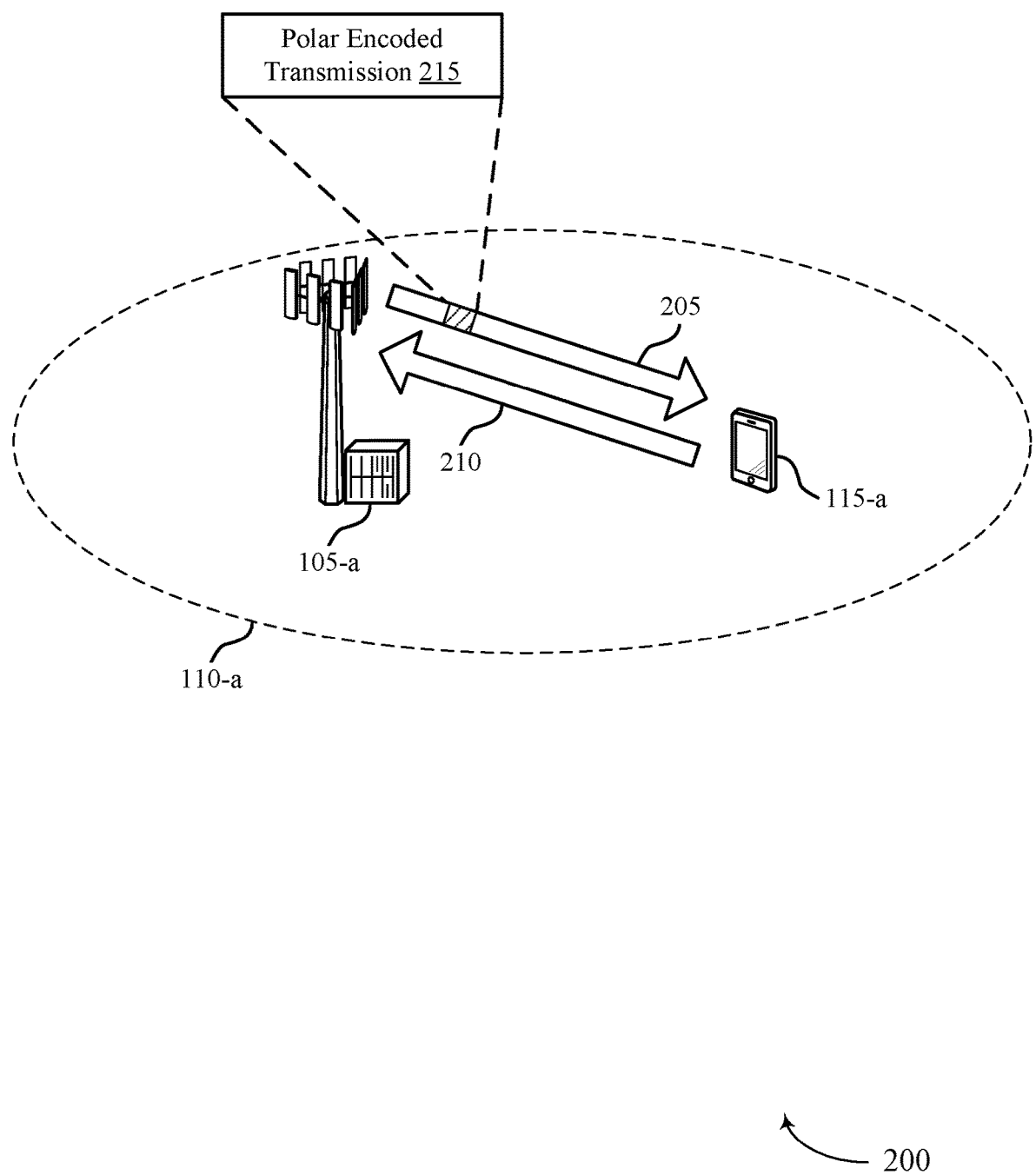

FIG. 2 illustrates an example of a wireless communications system 200 that supports low power downlink control channel monitoring in accordance with aspects of the present disclosure. In some examples, the wireless communications system 200 may implement aspects of a wireless communication system 100 and may include a UE 115-*a* and a base station 105-*a*, which may be examples of a UE 115 and a base station 105, respectively, described with reference to FIG. 1. The base station 105-*a* may provide network coverage for geographic coverage area 110-*a* and may communicate with the UE 115-*a* (e.g., over one or more downlink channels 205 and one or more uplink channels 210). For example, the base station 105-*a* may transmit control information and data to the UE 115-*a* on the downlink channel 205 (e.g., via a control channel, such as a PDCCH, and a data channel, such as a physical downlink shared channel (PDSCH)).

In some examples, the base station 105-*a* may send a transmission (e.g., a PDCCH transmission) in a decoding candidate of a control channel configured for the UE 115-*a*. The base station 105-*a* may encode the transmission using an error-correcting code, such as a polar code, and may transmit a polar encoded transmission 215 on the downlink channel 205 to the UE 115-*a*. By implementing a decoding scheme for monitoring resources of a control channel as described herein, the UE 115-*a* may reduce processing complexity and power consumption while reliably receiving and/or decoding the polar encoded transmission 215. Although described herein with the base station 105-*a* performing encoding and the UE 115-*a* performing decoding, it is to be understood that in some cases a UE 115-*a* may perform the encoding processes and a base station 105-*a* may perform the decoding processes described herein. Additionally or alternatively, the encoding and decoding techniques described herein may be implemented for sidelink or backhaul communications. Although described in the context of an NR system and using polar decoding, the methods and techniques described herein may be implemented in various other wireless communications systems and/or radio access technologies (RATs) and using various other decoding techniques.

In some systems (e.g., NR systems), the base station 105-*a* and the UE 115-*a* may handle encoding and decoding transmissions using polar codes. A polar code may employ a channel polarization transform between the coded bits and the input bits and may carry information bits on a set of bit indices or channels having the highest reliability of the channels. In some cases, the bits carrying information may be referred to as "information bits," while the remaining bits may be set to a pre-determined value known at both an encoder and decoder and may be referred to as "frozen bits." The base station 105-*a* may determine the set of information bits for transmission to the UE 115-*a*. These information bits may include payload bits corresponding to data bits, control information (e.g., DCI), or any other information for wireless transmission between devices. The information bits may also include error checking bits for improved decoding performance. The base station 105-*a* may polar encode the set of information bits to obtain a set of coded bits, referred to as mother code bits. The size of the set of mother code bits (i.e., the mother code length) may be a power of two based on the channel polarization transformation. The base station 105-*a* may use this set of coded bits to transmit the information to the UE 115-*a* in one or more polar encoded transmissions 215.

In the wireless communications system 200, the UE 115-*a* may "wake-up" (e.g., power-up or enable radio components) to monitor and/or search a control channel for control information. The UE 115-*a* may implement a decoding scheme to reduce power consumption and processing complexity, for example, when monitoring the downlink channel 205 (e.g., search spaces of a PDCCH including a set of decoding candidates). For example, the UE 115-*a* may determine one or more quality metrics based on channel conditions of the control channel (e.g., based on measurements of a PDCCH pilot, a CSI-RS pilot, among other examples). The quality metrics may be indicative, as an example, of an SNR, a signal-to-interference-plus-noise ratio (SINR), or a spectral efficiency of the control channel. In some examples, the UE 115-*a* may determine quality metrics associated with one or more aggregation levels, one or more DCI decoding candidates, or a combination thereof. The UE 115-*a* may compare the quality metrics to one or more thresholds (e.g., quality metric thresholds) and perform one or more decoding processes based on the comparison(s).

The UE 115-*a* may be configured (e.g., pre-configured) with one or more quality metric thresholds. The quality metric thresholds may be configured to enable the UE 115-*a* to perform power saving techniques (e.g., by selecting a decoding scheme) while maintaining decoding performance. In some cases, the UE 115-*a*, the base station 105-*a*, or a system determining the thresholds may use a performance metric to determine the thresholds. For example, a device may implement quality metric thresholds for selecting different decoding schemes such that the decoding performance degrades by less than 0.2 dB at a block error rate (BLER) of $10^{-2}$. Additionally or alternatively, the device may set the quality metric thresholds to account for potential inaccuracies in the quality metric (e.g., inaccuracies due to the relatively large variance of channel and/or noise covariance estimations when the channel has a low SNR). In some examples, the quality metric thresholds may be agnostic to the channel type. In some examples, the quality metric thresholds may be calculated for one or more aggregation levels (e.g., the quality metric thresholds may vary based on the aggregation level) and/or one or more coding rates. The quality metric thresholds may be tabulated (e.g., for each aggregation level and/or coding rate) and stored in memory at the UE 115-*a* (e.g., in a lookup table).

In some examples, the UE 115-*a* may refrain from processing a resource based on whether the quality metric satisfies a quality metric threshold. For example, the UE 115-*a* may determine that the quality metric is less than a quality metric threshold. The quality metric threshold may be configured such that a quality metric determined to be less than the quality metric threshold may indicate relatively poor channel conditions and a relatively low chance of success to decode the resource (e.g., the PDCCH candidate). The UE 115-*a* may abort processing of the resource based on the determination, which may save processing power (e.g., by aborting processing of PDCCH candidates that are unlikely to be successfully decoded at the UE 115-*a* based on the channel quality). In some cases, the UE 115-*a* may abandon (i.e., refrain from) performing a decoding process on the resource prior to beginning the decoding process based on the quality metric and the threshold.

In some other examples, the UE 115-*a* may determine that the quality metric satisfies one or more quality metric thresholds. For example, the UE 115-*a* may determine that the quality metric satisfies (e.g., is greater than or is greater than or equal to) a quality metric threshold. The UE 115-*a* may perform partial data tone processing based on the satisfied threshold. For example, the UE 115-*a* may determine to process a decoding candidate by puncturing (e.g., refraining from processing) particular resource elements and puncturing (e.g., zeroing) corresponding input soft-information for the decoding candidate (e.g., LLRs) for polar decoding based on relatively "good" channel conditions (e.g., a relatively high chance of success to decode the candidate at a higher code rate than the decoding candidate). For example, based on the channel conditions, the UE 115-*a* may determine that performing the partial processing may reduce decoding complexity while maintaining a relatively high decoding reliability (e.g., above a decoding reliability threshold). In some examples, the UE 115-*a* may select a code rate index based on whether a quality metric satisfies a quality metric threshold associated with the code rate index. For example, the UE 115-*a* may determine that the quality metric exceeds the quality metric threshold associated with the code rate index and perform partial processing of the decoding candidate such that the UE 115-*a* may save power (e.g., due to not processing particular resources) and increase an effective code rate (e.g., due to puncturing corresponding polar input LLRs) according to the code rate index. In some cases, based on the code rate index, the UE 115-*a* may perform partial processing at some aggregation levels and not others to meet a common code rate (e.g., a substantially similar code rate) at each aggregation level. In some cases, the UE 115-*a* may process the same number of resources (and, correspondingly, may puncture different numbers of input LLRs) at different aggregation levels according to a common code rate across aggregation levels.

For example, the UE 115-*a* may select a coding rate for reliable decoding based on current channel conditions (e.g., based on the quality metric) and may effectively equalize the coding rates across the aggregation levels of the control channel. The UE 115-*a* may puncture decoding candidates with lower coding rates (e.g., decoding candidates for higher aggregation levels) so that the effective coding rate for decoding the candidates is (e.g., within a rounding error) the selected coding rate. As the selected coding rate is greater than the original coding rate for the punctured candidates, the UE 115-*a* may save processing power (e.g., by refraining from processing a portion of resource elements, including refraining from symbol demapping and LLR calculation for demapped symbols). Accordingly, the UE 115-*a* may use approximately equal coding rates across different aggregation levels to reduce processing (e.g., demodulator processing, decoder processing, or both) at the higher aggregation levels.

In some examples, the UE 115-*a* may determine one or more processing parameters based on whether a quality metric satisfies a quality metric threshold. For example, the UE 115-*a* may determine that a quality metric satisfies a first threshold (e.g., the quality metric satisfies a threshold below which the UE 115-*a* may abort processing) and/or fails to satisfy a second threshold (e.g., the quality metric fails to satisfy a threshold above which the UE 115-*a* may partially process a decoding candidate). The UE 115-*a* may perform processing over the full set of resources based on the determination.

Additionally or alternatively, the UE 115-*a* may perform variable list size processing based on a quality metric (e.g., a quality metric associated with the channel or a code rate index). The UE 115-*a* may compare the quality metric to a quality metric threshold (e.g., a quality metric threshold associated with a reduced polar decoding scheme). The UE 115-*a* may use one or more parameters for decoding the candidate based on the comparison. For example, the UE 115-*a* may determine that the quality metric satisfies the quality metric threshold (e.g., is greater than the quality metric threshold) and may use a reduced SC list size 'L' (e.g., L=1, L=2) for a successive cancellation list (SCL) decoding process for the candidate by a channel decoder. For example, the satisfied quality threshold may be indicative of channel conditions that may support successful decoding with a reduced list size. In some other cases, the UE 115-*a* may determine that the quality metric fails to satisfy the quality metric threshold (e.g., is less than the quality metric threshold) and may use a default or maximum SC list size for the channel decoder (e.g., L=8, L=4, etc.). This default or maximum list size may support more reliable decoding in cases where the channel conditions indicate that the most reliable decoding path may not be successful (e.g., due to interference or distortion). Implementing a reduced polar decoding scheme may enable the UE 115-a to reduce the polar load (e.g., polar decoding processing overhead) while ensuring that DCI in a decoding candidate is reliably detected and decoded.

In some cases, the UE 115-a may use a single quality metric to determine the decoding scheme for monitoring the downlink control channel. In some other cases, the UE 115-a may use different quality metrics for different parameter selections. For example, the UE 115-a may use a first quality metric to determine whether to abort processing, perform full data tones processing, or perform partial data tones processing and may use a second quality metric to determine a list size for list decoding at a channel decoder. In yet some other cases, the UE 115-a may use different quality metrics for different aggregation levels, coding rates, or both.

Figure 3:
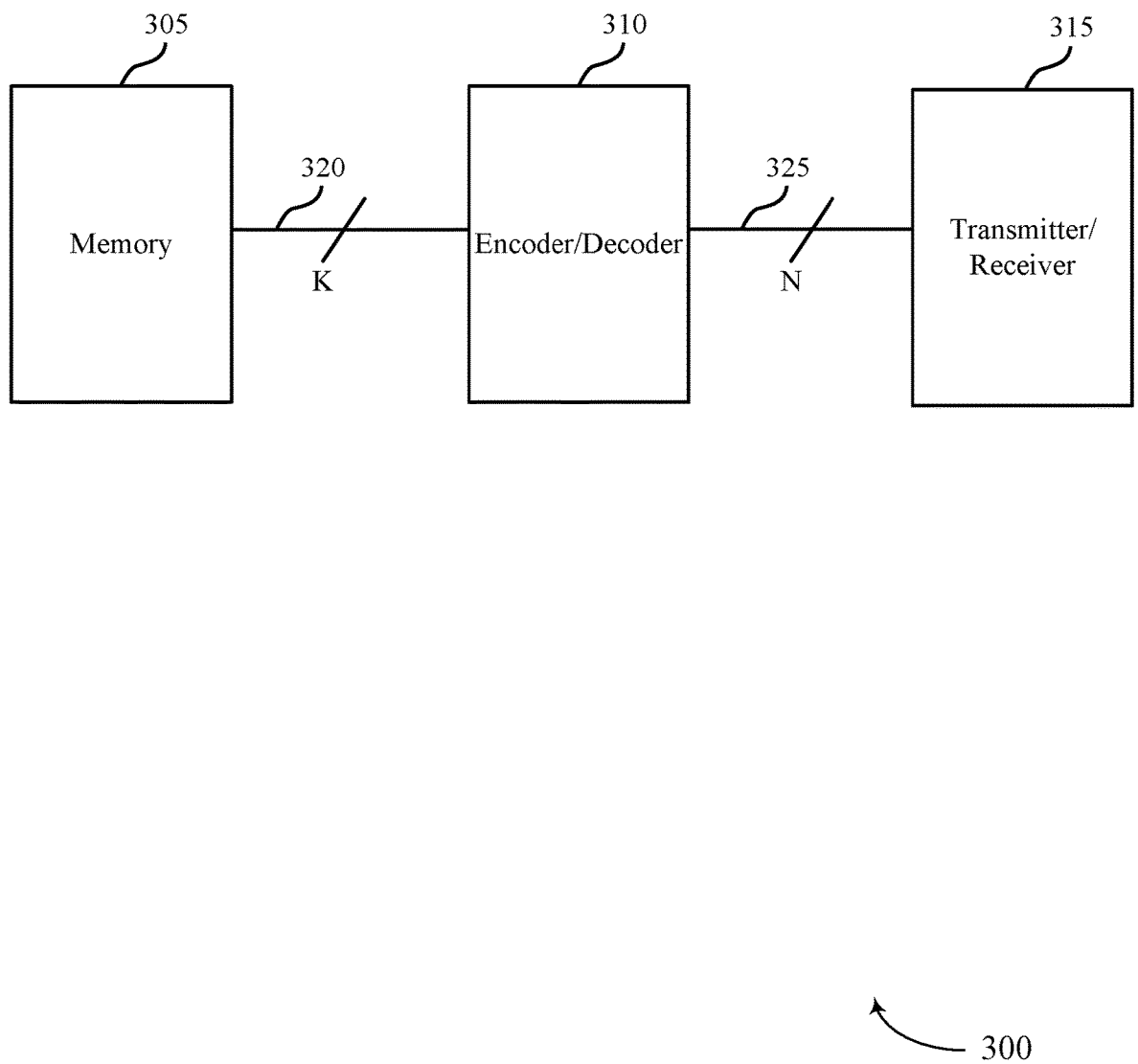
FIG. 3 illustrates an example of a device that supports low power downlink control channel monitoring in accordance with aspects of the present disclosure.

FIG. 3 illustrates an example of a device 300 that supports low power downlink control channel monitoring in accordance with aspects of the present disclosure. In some examples, the device 300 may be implemented by aspects of a wireless communications system 100 or 200. The device 300 may be any device within a wireless communications system that performs an encoding or decoding process (e.g., using an error-correcting code, such as a polar code). For example, the device 300 may be an example of a UE 115 or a base station 105 as described with reference to FIGS. 1 and 2.

As illustrated, the device 300 may include a memory 305, an encoder/decoder 310, and a transmitter/receiver 315. First bus 320 may connect the memory 305 to the encoder/decoder 310 and second bus 325 may connect the encoder/decoder 310 to the transmitter/receiver 315. In some cases, the device 300 may have data stored in the memory 305 to be transmitted to another device, such as a UE 115 or a base station 105. To initiate the transmission process, the device 300 may retrieve from memory 305 the data for transmission. For a PDCCH transmission, the data for transmission may include downlink control data for a UE 115 or a set of UEs 115. The data may include a number of payload bits, 'A,' which may be 1s or 0s, provided from the memory 305 to the encoder/decoder 310 via first bus 320. In some cases, these payload bits may be combined with a number of error checking bits (e.g., CRC bits), 'C,' to form a total set of information bits, 'A+C.' The number of information bits may be represented as a value 'K,' as shown (e.g., K=A+C). For PDCCH transmissions, this number of information bits, K, or the number of payload bits, A, may be based on the selected DCI format. The encoder/decoder 310 may implement a polar code with a block length, 'N,' for encoding the information bits, where N may be different than or the same as K. Such a polar code may be referred to as an (N, K) polar code. In some cases, the bits not allocated as information bits (e.g., N–K bits) may be assigned as frozen bits. Frozen bits may be bits with a default value known to both the encoding and decoding devices 300 (e.g., bits with a default bit value of 0).

The encoder 310 may perform the polar encoding process on the K information bits to determine a set of coded bits, referred to as mother code bits, of length N. The number of mother code bits, N, in this resulting mother code may be a power of 2 to support the polar encoding process. Some possible mother code sizes include, but are not limited to, N=32, 64, 128, 256, 512, or 1024 bits. However, the transmitter 315 may transmit a set of coded bits with a size, 'M,' that can be different from the size of the set of polar encoded bits in the mother code, N. In some cases, the number of coded bits for transmission is based on an aggregation level for the transmission. The encoder 310 may select the number of mother code bits N and a corresponding polar code of block length N based on the determined aggregation level, the number of information bits for transmission, or both.

In some wireless systems, the encoder/decoder 310 may be an example of an SC or an SCL decoder. A UE 115 or base station 105 may receive a transmission at a receiver 315 and may send the transmission to the SCL decoder (e.g., the encoder/decoder 310). The SCL decoder may determine input LLRs for the bit channels of the received codeword. During decoding, the SCL decoder may determine decoded LLRs based on these input LLRs, where the decoded LLRs correspond to each bit channel of the polar code. These decoded LLRs may be referred to as bit metrics. In some cases, if the LLR is zero or a positive value, the SCL decoder may determine the corresponding bit is a 0 bit, and a negative LLR may correspond to a 1 bit. The SCL decoder may use the bit metrics to determine the decoded bit values.

The SCL decoder may employ multiple concurrent SC decoding processes. Each SC decoding process may decode the codeword sequentially (e.g., in ascending order of the bit channel indices). Due to the combination of multiple SC decoding processes, the SCL decoder may calculate multiple decoding path candidates. For example, an SCL decoder of list size 'L'; (i.e., the SCL decoder has L SC decoding processes) may calculate L decoding path candidates, and a corresponding reliability metric (e.g., a path metric) for each decoding path candidate. The path metric may represent a reliability of a decoding path candidate or a probability that the corresponding decoding path candidate is the correct set of decoded bits. The path metric may be based on the determined bit metrics and the bit values selected at each bit channel. The SCL decoder may have a number of levels equal to the number of bit channels in the mother code length. At each level (e.g., for information bits), each decoding path candidate may select either a 0 bit or a 1 bit based on a path metric of the 0 bit and the 1 bit. The SCL decoder may select a decoding path candidate based on the path metrics and may output the bits corresponding to the selected decoding path as the decoded sets of bits. For example, the SCL decoder may select the decoding paths with the highest path metrics for error checking, and the decoder 310 may determine a successfully decoded path candidate based on a result of the error checking process.

The device 300 may be an example of a UE 115. The device 300 may monitor a control channel and may perform decoding processes (e.g., "blind" decoding processes) on decoding candidates of the control channel. The device 300 (e.g., using the decoder 310) may implement techniques to refrain from processing or partially processing decoding candidates of the control channel. For example, the device 300 may determine one or more quality metrics based on channel conditions of the control channel (e.g., based on measurements of pilot or reference signals associated with the control channel). The device 300 may compare the quality metric to one or more quality metric thresholds to select a decoding scheme for processing one or more decoding candidates (e.g., the decoding candidates of a particular aggregation level) using the decoder 310. In some examples, the device 300 may refrain from processing a resource (e.g., one or more decoding candidates) based on whether the quality metric satisfies a threshold. For example, the device 300 may determine that the quality metric is less than a threshold and may abort processing of one or more decoding candidates (e.g., the decoding candidates for a particular aggregation level), as there may be a relatively low chance of success to decode the candidates due to relatively "poor" channel conditions (e.g., the channel quality is below a minimum channel quality threshold).

Additionally or alternatively, the device 300 may determine that the quality metric satisfies one or more thresholds. The device 300 may perform partial data tone processing based on the satisfied thresholds. For example, the device 300 may determine to partially process (e.g., using the decoder 310) one or more decoding candidates by refraining from processing particular tones and puncturing corresponding input LLRs for polar decoding at the decoder 310 due to relatively "good" channel conditions (e.g., a relatively high chance of success to successfully decode the candidates if the candidates contain DCI, even after puncturing). For example, puncturing the corresponding input LLRs may involve setting an input LLR to a value of zero within a range of values from −Z to +Z, where +Z may indicate a bit value of 0 relatively strongly (e.g., a value closer to +Z may be more likely to correspond to a bit value of 0) and a value closer to −Z may indicate a bit value of 1 relatively strongly (e.g., a value closer to −Z may be more likely to correspond to a bit value of 1).

In some examples, the device 300 may decode one or more candidates based on whether a quality metric satisfies a threshold (e.g., associated with a coding rate). For example, the device 300 may determine a parameter for the decoder 310 (e.g., an SCL decoder 310) to use for processing the candidates. The decoder 310 may use a first SC list size (e.g., L=1, L=2) based on the quality metric satisfying a threshold or may use another SC list size (e.g., L=4, L=8) based on the quality metric failing to satisfy the threshold, among other examples. In some cases, the decoder 310 may support using more than two different list sizes (e.g., based on multiple thresholds).

Figure 4:
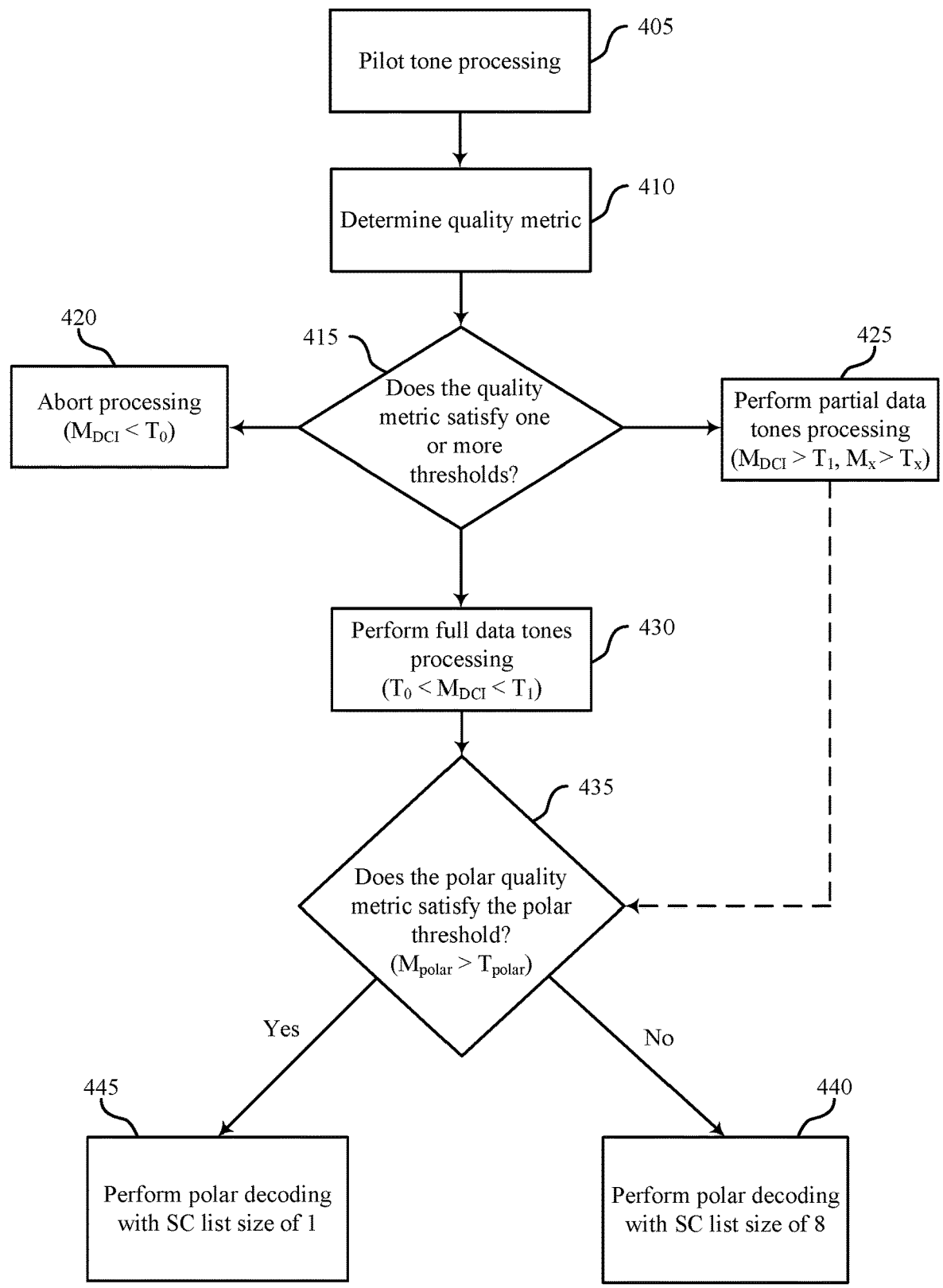
FIG. 4 illustrates an example of a flowchart that supports low power downlink control channel monitoring in accordance with aspects of the present disclosure.

FIG. 4 illustrates an example of a flowchart 400 that supports low power downlink control channel monitoring in accordance with aspects of the present disclosure. The flowchart 400 may implement aspects of the wireless communications systems 100 and 200. The flowchart 400 may be performed by a wireless device, such as a UE 115 as described with reference to FIGS. 1 through 3. In some examples, the flowchart 400 may illustrate a decoding scheme that enables the wireless device to save power and reduce processing complexity while maintaining reliable performance (e.g., successful reception and/or decoding of a PDCCH candidate).

At 405, the wireless device may perform pilot tone processing. For example, the wireless device may perform measurements of resources associated with a downlink control channel (e.g., pilot signals or reference signals associated with or indicative of a PDCCH). The pilot tone processing may include channel estimation, noise covariance estimation, SNR measurement, SINR measurement, or some combination of these or other channel quality estimation procedures. For example, the wireless device may process pilots associated with the downlink control channel, such as PDCCH pilots for the downlink control channel, CSI-RS pilots that may indicate information about the downlink control channel, or both. The wireless device may determine one or more channel metrics based on the pilot tone processing (e.g., an estimated noise covariance matrix, an estimated channel, an SNR, or some combination of these or other pilot tone processing).

At 410, the wireless device may determine one or more quality metrics. The quality metrics may be based on the pilot tone processing. For example, the quality metrics may be generated based on the one or more channel metrics, such as channel metrics of pilot signals or reference signals associated with the downlink control channel for the wireless device. In some cases, the wireless device may generate the quality metric by calculating the SNR over a set of resources. As an example, a quality metric of an "$n^{th}$" RE may be represented by Equation 1:

$$M_{RE,n} = \log_2(1+SNR_n) = \log_2(1+\widehat{h_n}^H C_n^{-1} \widehat{h_n}) \quad (1)$$

In Equation 1, the $M_{RE,n}$ may represent the quality metric associated with an $n^{th}$ RE (e.g., an RE of a decoding candidate of the PDCCH), the $\widehat{h_n}$ may represent the estimated channel associated with the $n^{th}$ RE, the $\widehat{h_n}^H$ may represent a channel matrix associated with the $n^{th}$ RE (e.g., a channel matrix with dimensions based on MIMO combinations for the wireless device), the $C_n^{-1}$ may represent the estimated noise covariance matrix associated with the $n^{th}$ RE, and the $SNR_n$ may represent the SNR associated with the $n^{th}$ RE. The determined quality metric for the channel may be similar to or indicative of a (non-constrained) spectral efficiency for the channel.

In some examples, the wireless device may determine a quality metric associated with a DCI message (e.g., DCI transmitted via multiple REs), which may be represented using Equation 2:

$$M_{DCI} = \Sigma_{\{n \in RE \text{ in } DCI\}} M_{RE,n} \quad (2)$$

In Equation 2, the $M_{DCI}$ may represent the quality metric associated with a DCI (e.g., a set of REs in a PDCCH search space that the wireless device may search for DCI associated with the wireless device). As shown, the $M_{DCI}$ may be calculated as the sum of the quality metrics of each RE associated with the DCI (e.g., the sum of each quality metric associated with each of the n REs for one or more DCI decoding candidates). In some examples, the $M_{DCI}$ may be calculated per aggregation level by summing the quality metrics of each RE associated with one or more DCI decoding candidates for an aggregation level.

In some examples, the wireless device may determine a quality metric associated with a coding rate index (e.g., denoted as 'x' below), which may be represented using Equation 3:

$$M_x = \Sigma_{\{n \in RE's \text{ } codeRate \text{ } x\}} M_{RE,n} \quad (3)$$

In Equation 3, the quality metric associated with the code rate index x (e.g., $M_x$) may indicate the channel conditions for each RE of the n REs for one or more DCI candidates relative to a coding rate (e.g., a coding rate indicated by the code rate index x). For example, the wireless device may determine to partially decode one or more DCI candidates in accordance with the coding rate using a puncturing pattern corresponding to a code rate index x for an aggregation level. The RE set "n∈RE's codeRate x" may include REs remaining (e.g., not punctured) according to the puncturing pattern. In some examples, the puncturing pattern may be associated with a DCI decoding candidate (e.g., the puncturing pattern may indicate which REs among multiple REs of the DCI decoding candidate are to be punctured). In some other examples, the puncturing pattern may be per aggregation level (e.g., the puncturing pattern may indicate which REs among multiple REs of multiple DCI decoding candidates of the aggregation level are to be punctured). The quality metric associated with the code rate index may satisfy a threshold associated with a code rate index (e.g., 1, 2, 3, etc.) and the wireless device may perform partial processing based on the satisfied threshold. As an example, the wireless device may determine a number of input LLRs to process (e.g., a number of input LLRs to puncture such that the wireless device processes the remaining, unpunctured LLRs) to increase an effective coding rate (e.g., to increase the coding rate to the coding rate indicated by the code rate index, among other examples).

In some examples, the wireless device may determine a quality metric associated with polar decoding, which may be represented using Equation 4:

$$M_{polar} = M_x \qquad (4)$$

The quality metric associated with the polar decoding may be the quality metric associated with the code rate index (e.g., the coding rate indicated by the code rate index) selected to use for decoding. For example, a code rate index may be selected based on a desired coding rate for polar decoding of a decoding candidate, and the wireless device may determine the quality metric associated with the polar decoding by calculating the quality metric associated with the selected code rate index.

At 415, the wireless device may determine whether the one or more quality metrics satisfy one or more thresholds. For example, the wireless device may calculate one or more quality metrics as described herein with reference to 410 and may compare a quality metric to quality metric thresholds. In some cases, the thresholds may be preconfigured for the decoding scheme. In some other cases, the wireless device may dynamically or semi-statically configure the thresholds based on one or more parameters (e.g., the priority level of control information, a number of previous decoding failures, or any other relevant parameter). In some examples, the wireless device may compare the quality metric associated with a DCI (e.g., with resources carrying the DCI) to a first threshold $T_0$. In some examples, the wireless device may determine that the quality metric associated with the DCI (e.g., $M_{DCI}$) fails to satisfy the first threshold $T_0$ (e.g., is less than or equal to the first threshold $T_0$) and the wireless device may proceed to 420 of the decoding scheme. In some other examples, the wireless device may determine that the quality metric associated with the DCI satisfies another threshold $T_1$ (e.g., is greater than or equal to the threshold $T_1$) and the wireless device may proceed to 425 of the decoding scheme. In some other examples, the wireless device may determine that the quality metric associated with the DCI fails to satisfy the threshold $T_1$ (e.g., is less than the threshold $T_1$) and satisfies the threshold $T_0$ (e.g., is greater than the threshold $T_0$). In some such examples, the wireless device may proceed to 430 of the decoding scheme. By comparing the quality metric to the one or more thresholds, the wireless device may select a reliable and power efficient decoding scheme for monitoring the downlink control channel. The wireless device may select the decoding scheme per aggregation level.

At 420, the wireless device may abort processing of one or more decoding candidates (e.g., of the REs that may include the DCI for a particular aggregation level of the PDCCH). For example, the wireless device may determine that the first threshold $T_0$ is not satisfied, which may indicate that the channel conditions are relatively "poor," resulting in a relatively low chance of the wireless device successfully processing the decoding candidates at this aggregation level. The wireless device may refrain from processing and/or further processing the decoding candidates in order to reduce processing complexity and save power (e.g., power associated with processing signals and performing decoding).

At 425, the wireless device may perform partial processing of one or more decoding candidates (e.g., the decoding candidates for the particular aggregation level). For example, the wireless device may determine that the quality metric associated with the DCI satisfies the quality metric threshold $T_1$, which may indicate relatively "good" channel conditions (e.g., a relatively high chance of success to successfully process the decoding candidate). In such examples, the wireless device may refrain from processing (e.g., ignore, puncture) one or more REs of the decoding candidate. For example, the one or more data tones may be unnecessary for successful decoding (e.g., due to the relatively good channel conditions), and the wireless device may refrain from processing (e.g., decoding) the one or more data tones to save power and/or increase an effective coding rate.

Additionally or alternatively, the wireless device may determine that the quality metric associated with a coding rate index (e.g., $M_x$) satisfies a corresponding threshold of the coding rate index 'x' (e.g., $T_x$). In some examples, thresholds for a range of coding rate indexes may be pre-configured for a first coding rate index (e.g., x=1) associated with a first code rate, a second coding rate index (e.g., x=2) associated with a second code rate, and so on (e.g., up to a fifth coding rate index, such as x=5, associated with a fifth code rate, among other examples). The wireless device may determine that the quality metric associated with a coding rate index 'x' satisfies one or more of the thresholds, which may indicate that channel conditions may support the coding rate index 'x' for an aggregation level including the decoding candidates. For example, the wireless device may determine that the quality metric associated with a second code rate (e.g., $M_2$) satisfies a threshold associated with the second code rate (e.g., $T_2$) and may select to process the decoding candidate using the second code rate (e.g., due to the quality metric indicating channel conditions that may support the second code rate). In some examples, the wireless device may additionally select the second code rate due to a quality metric associated with a third code rate (e.g., $M_3$) greater than the second code rate failing to satisfy a threshold associated with the third code rate (e.g., $T_3$). For example, the wireless device may select a maximum supported code rate, x, such that $M_x > T_x$. Accordingly, the wireless device may puncture symbol information for the control channel (e.g., the PDCCH) and/or perform a decoding process on the punctured symbol information. For example, the wireless device may puncture some input LLRs (e.g., input LLRs corresponding to the data tones the wireless device may refrain from processing) in order to save power and/or increase the effective coding rate to the selected code rate. The wireless device may puncture the input LLRs based on a predefined puncturing pattern or a random (or pseudo-random) puncturing pattern.

In some examples, the wireless device may puncture LLRs in order to obtain a higher coding rate (e.g., due to relatively "good" channel conditions indicated by a quality metric). For example, the wireless device may select an increased coding rate based on one or more calculations and/or determinations. Such calculations and/or determinations may be based on Table 1. Table 1 may illustrate some possible aggregation levels of a decoding candidate and corresponding examples of reduced aggregation levels and power savings in data processing of the decoding candidate.

TABLE 1

| Aggregation Level | Reduced Aggregation Level | Power Savings in data tone processing |
|---|---|---|
| 2 | 1 | 50% |
| 4 | 2 | 50% |
| 8 | 2 | 75% |
| 16 | 2 | 87% |

In some examples, the calculations may include a payload calculation. For example, the payload size (e.g., in bits) may be represented by Equation 5:

$$\text{Payload} = DCI + CRC = DCI + 24 \text{ bits} \tag{5}$$

In equation 5, the Payload may be the payload size in bits, the DCI may be the number of bits included in a DCI message, the CRC may be the number of bits included in a CRC code, which may be, as an example, 24 bits, although other values and payload calculations may be implemented.

Additionally or alternatively, the calculations may include an original rate (e.g., a code rate of the decoding candidate without LLR puncturing and/or partial tones processing). The original rate may be represented by Equation 6:

$$\text{Original Rate} = \frac{\text{Payload}}{(\text{bits } QPSK)*(REGs)*(\text{Data } REs)*(AggLev)} \tag{6}$$

In Equation 6, the bits QPSK may represent the number of bits modulated at once (e.g., 2 bits), the REGs may represent the number of RE groups (REGs) (e.g., 6 REGs), the Data REs may represent the number of data REs (e.g., 9 data REs), and the AggLev may represent the aggregation level, some examples of which are shown in Table 1. If the wireless device implements full data tones processing, the wireless device may decode candidates according to the original rate for the candidates.

The calculations may also include an increased rate (e.g., an increased rate based on Table 1 and the aggregation level of the decoding candidate). The increased rate may be represented by Equation 7:

$$\text{Increased Rate} = \frac{\text{Payload}}{(\text{bits } QPSK)*(REGs)*(\text{Data } REs)*(\text{Reduced } AggLev)} \tag{7}$$

In Equation 7, the bits QPSK may represent the number of bits modulated at once (e.g., 2 bits), the REGs may represent the number of RE groups (REGs) (e.g., 6 REGs), the Data REs may represent the number of data REs (e.g., 9 data REs), and the Reduced AggLev may represent the reduced aggregation level, some examples of which are shown in Table 1. This reduced aggregation level effectively increases the code rate for decoding candidates (e.g., if the wireless device implements partial data tones processing). In some cases, the increased rate may be an example of a maximum supported rate obtained by puncturing input LLRs.

In some examples, the wireless device may select coding rates based on the Table 1 and/or the calculations (e.g., determinations) described herein. For example, the wireless device may determine the coding rates and corresponding coding rate indexes based on the calculations. Additionally or alternatively, the wireless device may be configured with the quality metric thresholds associated with each coding rate index. As an example, the coding rates may be represented by Equation 8:

$$\text{Rates} = \{\text{Original Rate}, y*\text{Increased Rate}\} \tag{8}$$

The Rates may represent the coding rates selected for each of the coding rate indexes (e.g., an array of values, each value of the array corresponding to a coding rate index 'x' and/or a quality metric threshold). The y may represent an array of values used to determine the coding rates. For example, the y may be represented as y=[0.6, 0.7, 0.8, 0.9, 1] to determine five coding rates (e.g., associated with five coding rate indexes), among other examples.

In some examples, the wireless device may determine a coding rate based on a quality metric satisfying one or more quality metric thresholds (e.g., the thresholds associated with the five coding rates). In such examples, the wireless device may puncture input LLRs of one or more decoding candidates to utilize the coding rate for a particular aggregation level. For example, for each coding rate the number of input LLRs to be processed (e.g., the number of input LLRs that are not punctured) may be represented by Equation 9:

$$\# LLRs = \text{round}\left(\frac{\text{ceil}\left(\frac{\text{Payload}}{Rate_x}\right)}{2}\right) \tag{9}$$

In Equation 9, the $Rate_x$ may represent a candidate coding rate of the Rates described above. Accordingly, the wireless device may determine a number of LLRs to refrain from puncturing and may puncture any remaining LLRs (e.g., associated with unprocessed data tones) in order to process a decoding candidate using the selected coding rate. For example, for an aggregation level of 4, the wireless device may determine that the quality metric satisfies a coding rate index (e.g., code rate 2) associated with a coding rate of an aggregation level of 2 (e.g., a higher coding rate). By puncturing the LLRs in accordance with the calculations described herein, the wireless device may obtain a higher effective code rate (e.g., obtain an approximate code rate associated with the aggregation level of 2) for the decoding candidates at aggregation level 4, which may be supported by the channel conditions as indicated by the quality metric satisfying a code rate index threshold. In some such examples, to decode candidates at aggregation level 2, the wireless device may implement full data tones processing such that the coding rates for aggregation levels 2 and 4 are the same (or similar).

In some examples, the thresholds described herein (e.g., the threshold $T_0$, the threshold $T_1$, the thresholds associated with the one or more code rate indexes, the threshold associated with polar decoding, or any combination of these or other relevant thresholds) may be configured to provide power savings while maintaining performance (e.g., decoding performance). For example, the decoding performance at a given BLER (e.g., a BLER of $10^{-2}$) may be degraded by less than a threshold amount (e.g., 0.2 dB) when implementing decoding based on the quality metric thresholds. Additionally or alternatively, the thresholds may be set to account for inaccuracies in the quality metric (e.g., inaccuracies due to the relatively large variance of channel and/or noise covariance estimations when the channel has a relatively low SNR), such that the decoding process is robust to channel estimation errors or variances. In some examples, the thresholds may be agnostic to the channel type (e.g., the thresholds may be configured for various channel types, updated for various channel types, among other examples). In some examples, the quality metric thresholds may be tabulated (e.g., for each aggregation level illustrated in Table 1, for each coding rate determined based on Table 1, among other examples).

At 430, the wireless device may perform full data tones processing (e.g., of the REs that may include the DCI of a PDCCH). For example, the wireless device may determine that the quality metric associated with the DCI satisfies the threshold $T_0$ (e.g., is greater than or equal to $T_0$), but fails to satisfy the threshold $T_1$ (e.g., is less than or equal to $T_1$). The wireless device may determine to perform full data tones processing based on the determination. For example, the wireless device may perform interference rejection combining (IRC) equalization and/or determine input polar LLRs for the decoding candidate (e.g., for each RE associated with the decoding candidate). Such a procedure may enable the wireless device to maintain the reliability of successfully processing (e.g., monitoring for, receiving, and decoding) DCI in a decoding candidate, for example, when channel conditions are relatively "good" enough for processing, but relatively too "poor" to implement partial tone processing (e.g., without significantly impacting reliability).

At 435, the wireless device may determine whether a quality metric (e.g., $M_{polar}$ associated with a selected coding rate for the decoding process) satisfies one or more thresholds (e.g., a polar threshold pre-configured for the wireless device). The wireless device may determine one or more processing parameters based on the quality metric satisfying or failing to satisfy the one or more thresholds. The wireless device may determine parameters that control a decoder quality (e.g., increase the chance of successful decoding) and/or a power consumption. For example, the decoding procedure may be a turbo decoding procedure, and the wireless device may determine a number of iterations of the decoder (e.g., more iterations to increase the decoder quality, fewer iterations to reduce the power consumption).

As an example, the wireless device may determine (e.g., build) the polar quality metric as described herein, and compare the polar quality metric to a polar quality metric threshold $T_{polar}$. The wireless device may determine whether the polar quality metric satisfies the threshold $T_{polar}$. For example, the wireless device may determine that the polar quality metric fails to satisfy (e.g., is less than) the threshold $T_{polar}$ and the wireless device may proceed to 440 of the decoding scheme. In some other examples, the wireless device may determine that the polar quality metric satisfies (e.g., is greater than) the threshold $T_{polar}$ and the wireless device may proceed to 445 of the decoding scheme. In some cases, the wireless device may implement additional thresholds to support additional possible decoding parameters (e.g., multiple supported list sizes for decoding).

At 440, the wireless device may perform polar decoding with a first SC list size. For example, the wireless device may use a default SC list size (e.g., 8), which may be an example of a maximum list size supported by a channel decoder, for processing the decoding candidate as described herein. Such an SC list size may enable the wireless device to reliably process the decoding candidate and increase the chance of successful decoding.

At 445, the wireless device may perform polar decoding with a second, reduced SC list size (e.g., an SC list size of 2, or an SC list size of 1, corresponding to SC decoding rather than SCL decoding). Other reduced SC list sizes may be supported by the wireless device. Such a reduced SC list size may enable the wireless device to save power and reduce the decoding processing complexity (e.g., when the channel conditions are "good" and the reduced SC list size may maintain decoding reliability). For example, maintaining 1 decoding path, as opposed to 8 decoding paths, may result in approximately 87% polar processing savings.

In some examples, the techniques described herein may result in expected operational characteristics for the wireless device. For example, a DCI message may be transmitted to the wireless device with relatively good channel conditions (e.g., a high SNR, which may result in a relatively high-quality metric). Accordingly, the wireless device may implement power saving techniques (e.g., due to the relatively good channel conditions). For example, the wireless device may perform partial data tones processing based on the quality metric and one or more thresholds. To detect such partial data tones processing, the transmitting device (e.g., a base station 105) may implement puncturing. For example, the transmitting device may puncture part of a DCI message (e.g., according to a first puncturing pattern). Based on the quality metric, the wireless device monitoring for the DCI message may also perform puncturing (e.g., according to a second puncturing pattern) if implementing a partial data tones processing scheme. Such puncturing at the wireless device may result in the wireless device failing to successfully decode the DCI message, even with the relatively good channel conditions, based on the combination of puncturing at the transmitting device and puncturing at the receiving wireless device. For example, the puncturing at the receiving wireless device may significantly reduce processing resources used for decoding by removing superfluous redundancy from an unpunctured DCI message, which may not be present in a punctured DCI message.

In some examples, the operational characteristics may include failure for a predistorted message according to an alternate candidate decoding path. For example, a transmitting device (e.g., a base station 105) may transmit a "distorted" signal (e.g., a distorted PDCCH signal) to the wireless device in relatively good channel conditions. In some examples, the distorted signal may be generated (e.g., by the transmitter) by calculating the CRC code on a payload (e.g., the payload of a DCI message carried on the distorted signal), attaching the CRC code to the payload, and inverting (e.g., changing a 0 to a 1, or vice versa) some of the encoded bits. For example, the transmitter may invert the most "likely" bit (e.g., a most reliable bit) to be selected in a polar decoding tree as described with reference to FIG. 5. Such a distorted signal may result in the wireless device failing to successfully decode the DCI message. For example, if the wireless device selects to use a list size of 1 (e.g., to save power in the relatively good channel conditions) and tracks the most "likely" decoding path (i.e., the decoding path with the lowest path metric), the inverted bit may cause the most "likely" decoding path to fail. In such examples, the wireless device may fail decoding (e.g., due to utilizing the list size of 1 rather than a larger list size, in which an additional decoding path may capture the original, undistorted payload). For example, the list size reduction for a channel decoder implemented at the receiving wireless device may significantly reduce processing resources used for decoding by removing superfluous redundancy of multiple paths, which may not handle intentionally distorted DCI messages.

In some examples, the wireless device may perform the operations of the flowchart 400 for multiple decoding processes. For example, the wireless device may perform the operations described herein for different aggregation levels and/or coding rates of a control channel (e.g., using the thresholds associated with each aggregation level and/or coding rate as described herein). Such an example may result in the wireless device discarding some aggregation level DCI decoding candidates based on a low probability of detection, fully processing some aggregation level DCI decoding candidates, partially processing some aggregation level DCI decoding candidates based on a high probability of detection even with the partial processing, or some combination thereof. Additionally or alternatively, changing channel conditions may result in the wireless device implementing different decoding schemes for a same aggregation level at different monitoring occasions (e.g., based on different quality metrics measured for the downlink control channel). For example, the wireless device may perform a decoding process for an aggregation level in a first monitoring occasion based on the channel conditions during that monitoring occasion (e.g., and based on the corresponding quality metric) and may refrain from performing an additional decoding process for the aggregation level in a second monitoring occasion based on the channel conditions (e.g., an additional measurement of the resources associated with the downlink control channel) during the second monitoring occasion (e.g., and based on the corresponding additional quality metric failing to satisfy each threshold in the second monitoring occasion).

Figure 5:
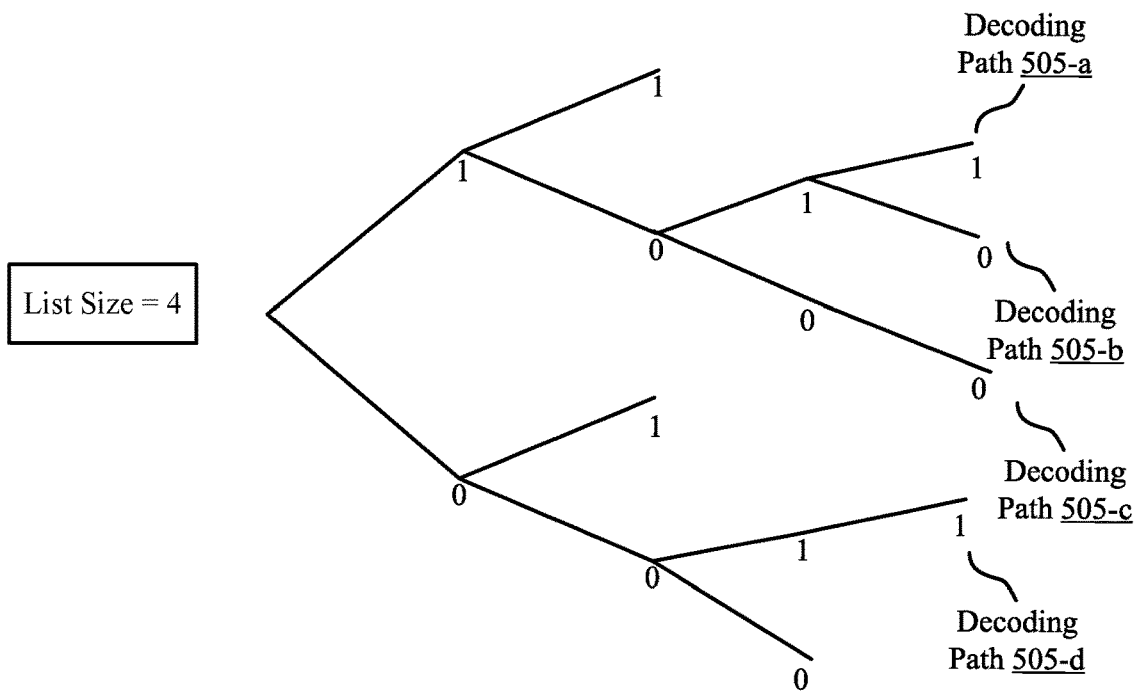
FIG. 5 illustrates an example of decoding trees that support low power downlink control channel monitoring in accordance with aspects of the present disclosure.
Figure 5:
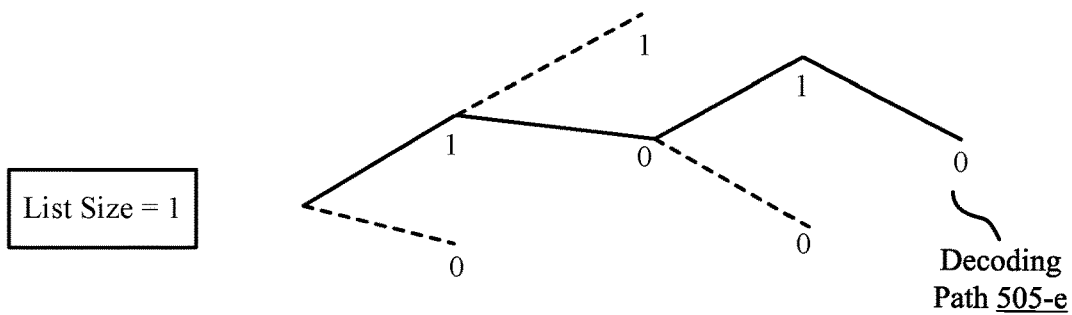

FIG. 5 illustrates an example of decoding trees 500 that support low power downlink control channel monitoring in accordance with aspects of the present disclosure. The decoding trees 500 may be implemented by a device, such as a UE 115 or a device 300 as described with reference to FIGS. 1 through 4. The decoding trees 500 may represent a list decoding operation (e.g., performed by a wireless device) utilizing a default list size L (e.g., L=4) and/or utilizing a reduced list size L (e.g., L=1). In some examples, the default list size may be different than illustrated (e.g., L=8, among other examples) and the reduced list size may be different than illustrated (e.g., L=2, among other examples). In some cases, an SCL decoder may implement the default list size or the reduced list size for processing a decoding candidate based at least in part on a quality metric satisfying a threshold as described herein. The decoding trees 500 may be illustrated such that each branch of the decoding trees 500 corresponds to the determined bits for a decoding path 505.

As illustrated, a device may perform a list decoding process using a polar code and a default list size of L=4 (e.g., if a channel decoder supports a maximum list size of 4). For example, the device may determine to use the default list size based on a quality metric failing to satisfy a threshold (e.g., in order to maintain decoding reliability for a decoding process of a decoding candidate), based on a maximum list size supported by the device, or both. At a first level of the decoding process (e.g., for a first bit in the sequence of bits), the decoder may track two decoding paths 505 (e.g., one path with a 1 bit value and one path with a 0 bit value). In some cases, this may not be the first bit of the decoding process and may instead be the first information bit of the decoding process (e.g., the decoder may maintain a single decoding path 505 for a set of preceding frozen bits before the first information bit in the codeword). At a second level of the decoding process, the decoder may split the two decoding paths 505 into four decoding paths 505 (e.g., corresponding to the decoded bit values 00, 01, 10, and 11). At a third level of the decoding process, the decoder may determine the four decoding paths 505 with the "best" (e.g., lowest) path metrics. For example, based on the four decoding paths 505 at the second level, the decoder has eight possible decoding paths 505 at the third level (e.g., corresponding to the decoded bit values 000, 001, 010, 011, 100, 101, 110, and 111). However, due to the list size of the decoder (e.g., in this case, L=4), the decoder may select the decoding paths 505 most likely to be successful based on the calculated path metrics for each of these eight paths, where the path metrics are calculated based on the input LLR values for the received decoding candidate. As illustrated, the decoding paths 505 containing the decoded bit values 000, 001, 100, and 101 may correspond to the most reliable paths (e.g., the paths with the lowest path metrics of the eight possible paths). At a fourth level of the decoding process, the decoder may again determine the four decoding paths 505 (e.g., decoding paths 505-a, 505-b, 505-c, and 505-d) with the best (e.g., lowest) path metrics based on the four surviving decoding paths 505.

Additionally or alternatively, the decoder may perform a list decoding process using a polar code and a reduced list size of L=1. For example, the device may determine to use the reduced list size based on a quality metric satisfying a threshold (e.g., in order to reduce processing complexity and save power when the channel conditions are relatively "good"). At a first level of the decoding process (e.g., for a first bit in the sequence of bits), the decoder may test two decoding paths 505 (e.g., one path with a 1 bit value and one path with a 0 bit value). In some cases, this may not be the first bit of the decoding process and may instead be the first information bit of the decoding process (e.g., the decoder may maintain a single decoding path 505 for a set of preceding frozen bits before the first information bit in the codeword). The decoder may determine the decoding path 505 with the "best" (e.g., lowest) path metric. For example, the decoder may have two possible paths (e.g., corresponding to the decoded bit values 0 and 1). However, due to the reduced list size in this example (e.g., L=1), the decoder may select the decoding path 505 most likely to be successful based on the calculated path metrics for each of the two decoding paths 505 (e.g., path metrics based on the input LLR values for the decoding candidate). As illustrated, the process may continue until the decoding path 505-e is the surviving decoding path 505. As illustrated, performing decoding using the reduced list size, as opposed to the default list size, may significantly reduce the processing overhead associated with the list decoding process (e.g., by 75%).

In some examples, the decoder may identify bits of one or more of the paths 505 as the successfully decoded bits (e.g., based on error correction procedures). After removing any frozen bits from this set of bits, the decoder may determine the payload bits received in the transmission. In some cases, these payload bits may correspond to DCI received in a PDCCH transmission (e.g., via REs of a search space).

Figure 6:
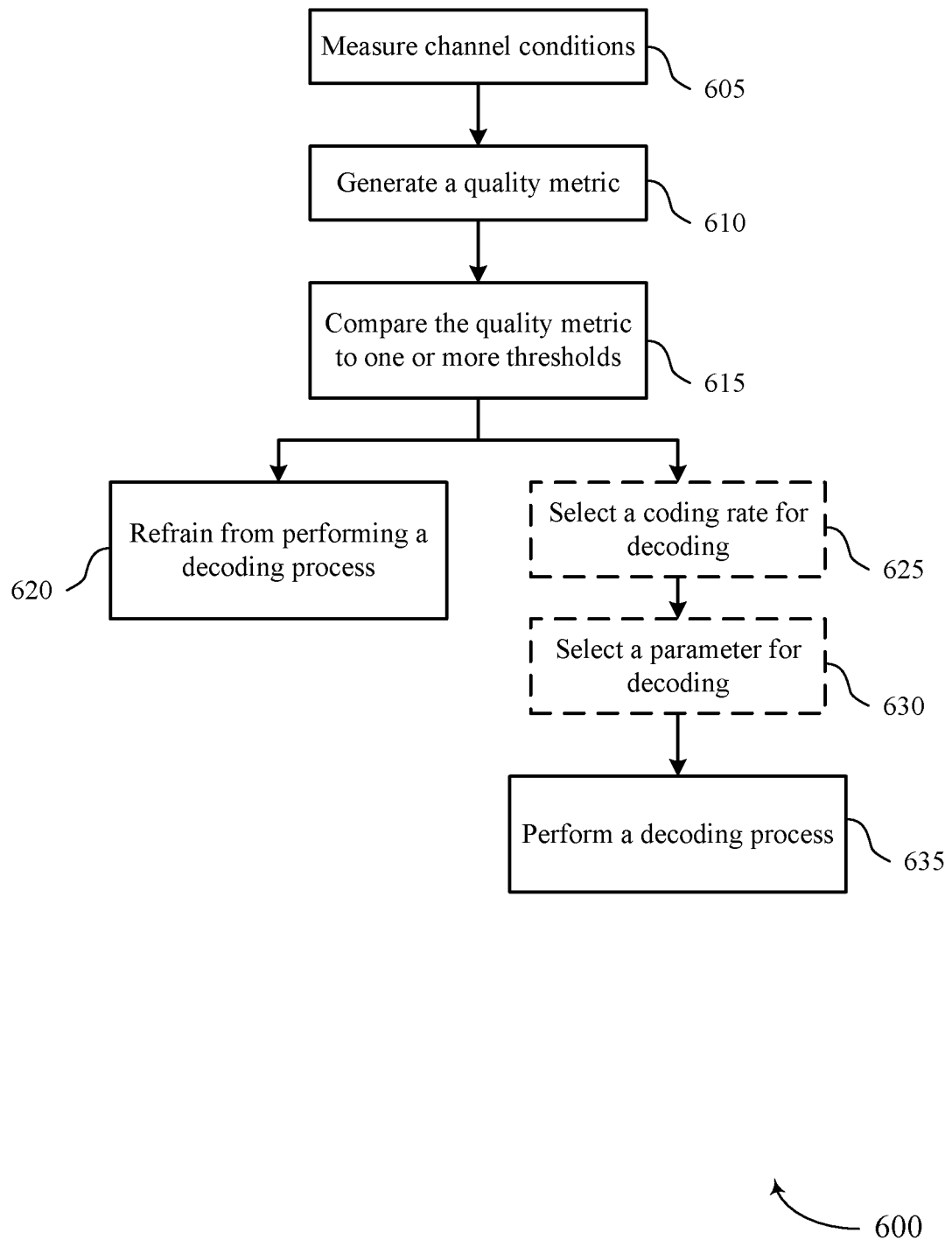
FIG. 6 illustrates an example of a flowchart that supports low power downlink control channel monitoring in accordance with aspects of the present disclosure.

FIG. 6 illustrates an example of a flowchart 600 that supports low power downlink control channel monitoring in accordance with aspects of the present disclosure. The flowchart 600 may implement aspects of the wireless communications systems 100 and 200. The flowchart 600 may be performed by a wireless device, such as a UE 115 as described with reference to FIGS. 1 through 5. In some examples, the flowchart 600 may illustrate a decoding scheme that enables the wireless device to save power and reduce processing complexity, while maintaining reliable performance (e.g., successful reception and/or decoding of DCI in a PDCCH candidate).

At 605, the wireless device may measure channel conditions. For example, the wireless device may perform channel estimation procedures (e.g., on one or more pilot tones) to measure the channel conditions. The channel estimation procedures may include a channel estimation for REs of a downlink control channel (e.g., CCEs), a noise covariance measurement of the REs of the downlink control channel, etc. For example, the channel estimation procedures may include the pilot tone processing (e.g., at 405) as described with reference to FIG. 4.

At 610, the wireless device may generate a quality metric. The quality metric may be based on the measured channel conditions. For example, the quality metric may be based on a set of REs in a decoding candidate for the decoding process (e.g., a decoding candidate associated with an aggregation level), the channel estimation of the REs, the noise covariance of the REs, or a combination thereof. As an example, the wireless device may determine a quality metric (e.g., at 410, among other examples) as described with reference to FIG. 4. In some examples, the wireless device may determine multiple aggregation level-specific quality metrics based on the measured channel conditions.

At 615, the wireless device may compare the quality metric to one or more thresholds. The wireless device may include thresholds (e.g., pre-configured thresholds) and the wireless device may determine whether the quality metric satisfies one or more of the thresholds. In some examples, the pre-configured thresholds may be associated with various aggregation levels or coding rates. For example, the one or more thresholds may include a first set of thresholds for a first aggregation level and/or a first coding rate, a second set of thresholds for a second aggregation level and/or a second coding rate, etc., among other examples. As an example, the one or more thresholds may be examples of the quality metric thresholds (e.g., $T_0$, $T_1$, $T_x$, $T_{polar}$, etc.) as described with reference to FIG. 4, for example, at 415, 420, 425, 430, and/or 435.

At 620, the wireless device may refrain from performing a decoding process. For example, the wireless device may compare the quality metric to a threshold and determine that the quality metric fails to satisfy the threshold (e.g., the quality metric is less than the threshold). In such examples, the wireless device may refrain from performing a decoding process, such as refraining from performing a decoding process for a subset of a set of configured decoding candidates (e.g., the decoding candidates for one or more particular aggregation levels). As an example, the wireless device may abort processing as described with reference to FIG. 4, e.g., at 420 when $M_{DCI}$ is less than the threshold $T_0$.

In some examples, at 625, the wireless device may select a coding rate for decoding. For example, the wireless device may compare the quality metric to thresholds associated with coding rates and determine that the quality metric satisfies one of the thresholds (e.g., $M_x > T_x$ as described with reference to FIG. 4). The wireless device may select the coding rate, refrain from processing one or more REs of the downlink control channel according to the selected coding rate, and puncture symbol information for the downlink control channel associated with the one or more REs. As an example, the wireless device may select a coding rate and perform partial data processing as described with reference to FIG. 4, e.g., at 425, among other examples.

In some examples, at 630, the wireless device may select a parameter for decoding. The wireless device may select one or more parameters that control the tradeoff between decoder quality and power consumption, such that the wireless device reduces power consumption when channel conditions are relatively "good" (e.g., as determined by a quality metric and one or more thresholds). The wireless device may compare a quality metric to a threshold (e.g., $M_{polar}$ and $T_{polar}$ as described with reference to FIG. 4). In some examples, the parameter may be a list size for a polar decoding procedure. The wireless device may select a maximum list size supported by the wireless device or a reduced list size based on the comparison. For example, the wireless device may select an SC list size of 1 (e.g., when $M_{polar} > T_{polar}$), a default SC list size of 8 (e.g., when $M_{polar} \leq T_{polar}$), among other examples. As an example, the wireless device may select and use an SC list size as described with reference to FIGS. 4 and 5.

At 635, the wireless device may perform a decoding process. The wireless device may compare the quality metric to one or more thresholds and determine to process or partially process the decoding candidate of the downlink control channel. For example, the wireless device may ignore some data tones (i.e., refrain from processing one or more REs of the downlink control channel according to a selected coding rate) and/or puncture symbol information for the control channel associated with the one or more REs, perform full data tone processing and perform a decoding process (e.g., using one or more selected decoding parameters, such as a selected or default SC list size as described herein), or any combination thereof. As an example, the wireless device may perform partial data tones processing, polar decoding with an SC list size of 8, perform polar decoding with an SC list size of 1, or any combination thereof as described with reference to FIG. 4 (e.g., at 425, at 440, and at 445) as well as FIG. 5.

Figure 7:
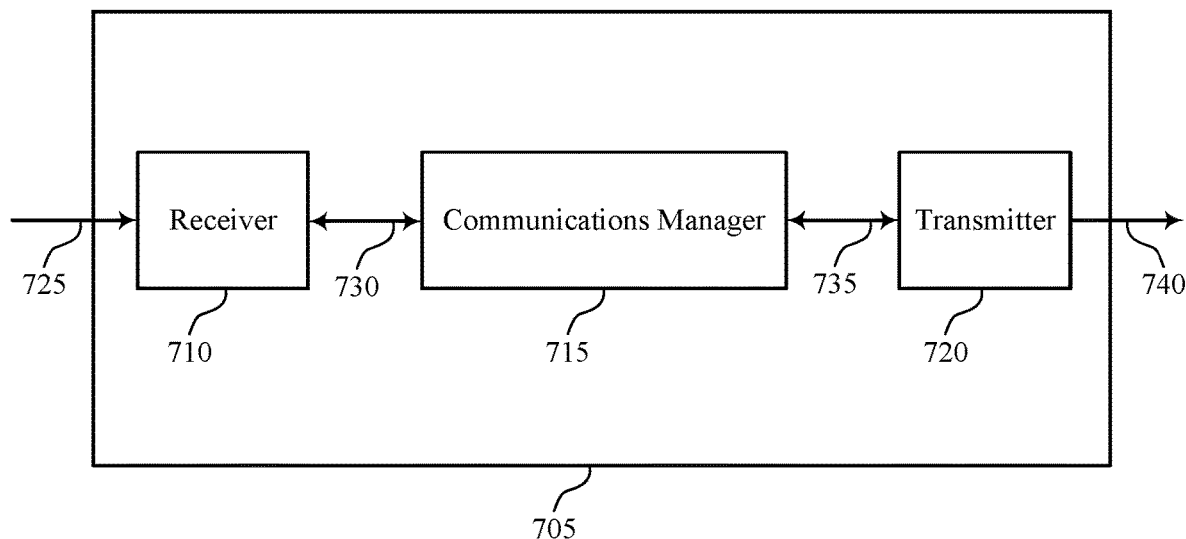
FIGS. 7 and 8 show block diagrams of devices that support low power downlink control channel monitoring in accordance with aspects of the present disclosure.

FIG. 7 shows a block diagram 700 of a device 705 that supports low power downlink control channel monitoring in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information 725 such as packets, user data, or control information associated with various information channels (e.g., control channels, data channels, or both). For example, the receiver 710 may demodulate signals received over monitored time-frequency resources to obtain bits that indicate the information 725. In some cases, the information 725 may include a set of input LLRs for decoding candidates of a channel, such as a downlink control channel. The receiver 710 may pass this information, as information 730, on to other components of the device 705. For example, the receiver 710 may electrically send the information 730 received from another device (e.g., a base station 105)—such as channel condition information, downlink control channel information (e.g., monitoring results of a decoding candidate), and the like—to the communications manager 715. The receiver 710 may be an example of aspects of the transceiver 1020 described with reference to FIG. 10. The receiver 710 may utilize a single antenna or a set of antennas.

The communications manager 715 may perform a measurement of resources associated with a downlink control channel to obtain a quality metric for the downlink control channel, compare the quality metric to one or more thresholds, and perform a decoding process on one or more of a set of configured decoding candidates for the downlink control channel based on a result of the comparing. For example, the communications manager 715 may receive the information 730 containing bits indicating channel quality information for the downlink control channel, bits indicating input LLRs for the decoding candidates, or a combination thereof. The communications manager 715 may perform decoding processes on this information 730 to obtain decoding results for the decoding candidates. If the communications manager 715 identifies successfully decoded DCI in one or more of the decoding candidates, the communications manager 715 may pass the decoded information bits to other components of the UE 115 for processing (e.g., as information 735). The communications manager 715 may be an example of aspects of the communications manager 1010 described with reference to FIG. 10. In some cases, the communications manager 715 may include, be an example of, or be a component of a channel decoder.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 715 as described herein may be implemented to realize one or more potential advantages. One implementation may enable a wireless device, such as a UE 115, to perform measurements associated with a channel, determine one or more quality metrics based on the measurements, and process one or more decoding candidates based on the quality metric(s) (e.g., refraining from decoding a decoding candidate, performing an adjusted procedure such as puncturing data tones of the decoding candidate, processing the candidate using a reduced list size, among other examples). Such an implementation may enable the wireless device to refrain from processing a decoding candidate when the decoding candidate is unlikely to be successfully decoded based on current channel conditions, partially process the decoding candidate when the wireless device is relatively likely to successfully decode the candidate if the candidate includes a DCI message (e.g., to obtain a higher coding rate than the aggregation level supports in a full decoding procedure), reduce a list size for decoding the decoding candidate if the current channel conditions are relatively good (e.g., to reduce the processing resource usage for list decoding), among other examples, which may result in reduced processing complexity and/or power consumption, for example, when monitoring decoding candidates for DCI.

Based on implementing the decoding scheme as described herein, a processor of the UE 115 (e.g., a processor controlling the receiver 710, the communications manager 715, the transmitter 720, or a combination thereof) may reduce processing resources used for control channel monitoring. For example, the decoding scheme may provide for power saving operations while maintaining decoding reliability at the UE 115. As such, the UE 115 may reduce the number of decoding processes performed to successfully receive information from a base station 105. For example, the UE 115 may abandon processing decoding candidates "unlikely" to be successfully decoded at the UE 115 in relatively poor channel conditions (e.g., based on an SNR or spectral efficiency for the downlink control channel falling below a threshold value), implement more efficient decoding procedures such as using a reduced list size in relatively good channel conditions (e.g., based on the SNR or spectral efficiency falling above a threshold value), partially process a decoding candidate in relatively good channel conditions, etc. Such techniques may reduce the number of decoding candidates the UE 115 may fully process and fully decode, which may reduce the number of times the UE 115 turns on processing units to handle downlink message reception and decoding and reduce the amount of time that the processing units are active. For example, the UE 115 may save baseband processing power and may support faster switching to a sleep mode (e.g., in discontinuous reception (DRX) operation), further reducing power consumption. Therefore, the UE 115 may realize increased power savings and reduced decoding complexity at the processor of the UE 115.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas. For example, the transmitter 720 may receive information 735 and transmit information 740 over a channel. In some cases, the information 735 may include information bits for transmission, and the transmitter 720 may encode the information bits into a message, identify time-frequency resources over which the message is to be transmitted, and modulate the transmission over the identified time-frequency resources. The transmitted message may include the information 740. In some cases, this information 740 may be transmitted in response to DCI received by the UE 115 and decoded by the communications manager 715.

Figure 8:
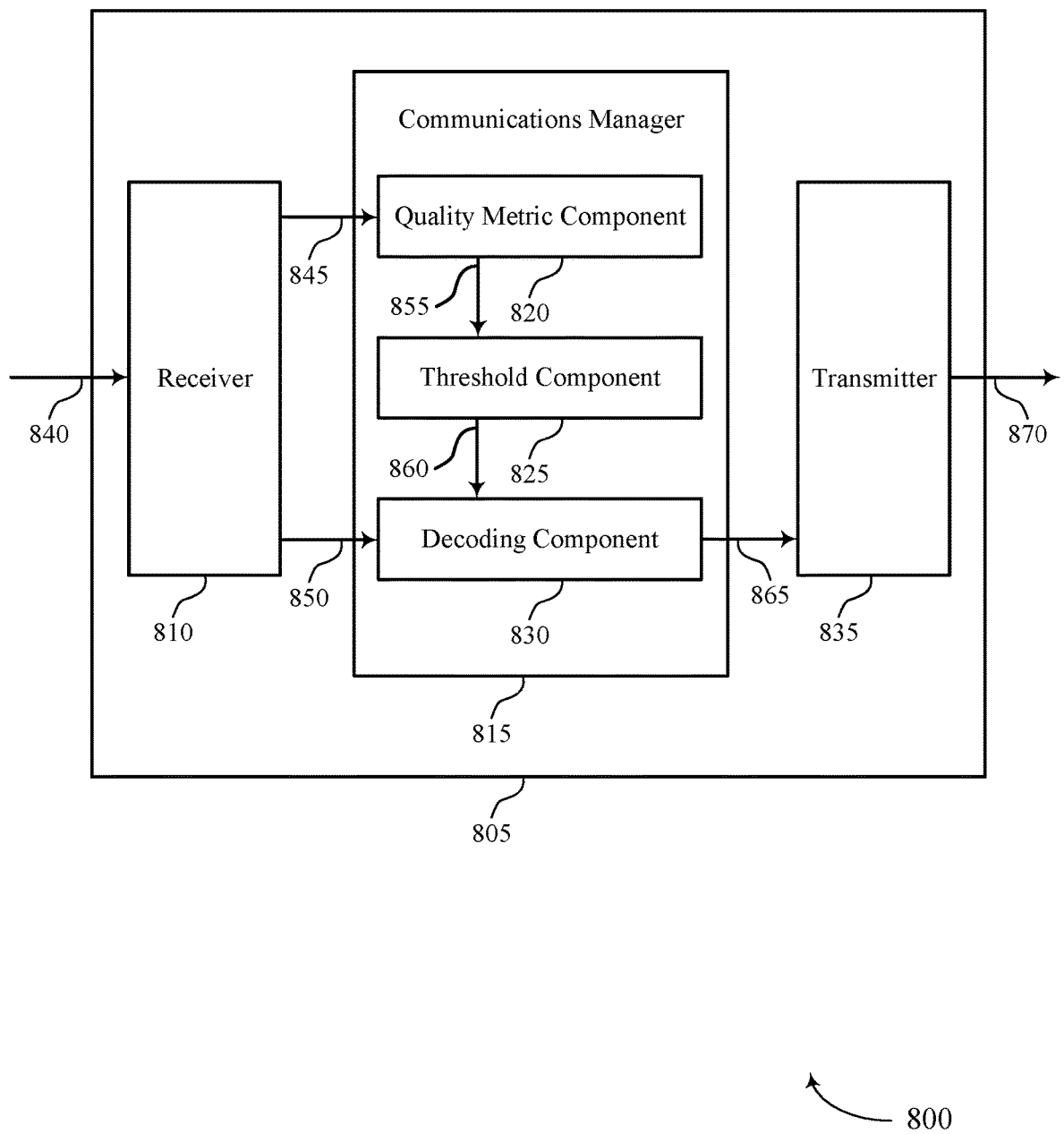

FIG. 8 shows a block diagram 800 of a device 805 that supports low power downlink control channel monitoring in accordance with aspects of the present disclosure. The device 805 may be an example of aspects of a device 705 or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information 840 such as packets, user data, or control information associated with various information channels (e.g., control channels, data channels, or both). The information 840 may be a set of bits representing channel quality information, input bits (e.g., input LLRs) for decoding candidates of a downlink control channel, or both. Information may be passed on to other components of the device 805. For example, the receiver 810 may electrically send information received from another device (e.g., a base station 105), such as channel condition information, downlink control channel information (e.g., monitoring results of a decoding candidate), and the like, to the communications manager 815. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a quality metric component 820, a threshold component 825, and a decoding component 830. The communications manager 815 may be an example of aspects of the communications manager 1010 described with reference to FIG. 10.

The quality metric component 820 may perform a measurement of resources associated with a downlink control channel to obtain a quality metric for the downlink control channel. For example, the quality metric component 820 may receive a set of bits indicating channel quality information 845 from the receiver 810 for the downlink control channel. The quality metric component 820 may determine the quality metric based on the channel quality information 845 and may output a set of bits 855 indicating the quality metric to the threshold component 825.

The threshold component 825 may compare the quality metric to one or more thresholds. For example, the threshold component 825 may receive the set of bits 855 indicating the quality metric and may compare this quality metric to a set of thresholds. The threshold component 825 may output a set of bits 860 indicating a result of the comparing to the decoding component 830. For example, the set of bits 860 may indicate between which threshold values the quality metric falls.

The decoding component 830 may perform a decoding process on one or more of a set of configured decoding candidates for the downlink control channel based on a result of the comparing. For example, the decoding component 830 may receive an indication of the result of the comparing in the set of bits 860. The decoding component 830 may additionally receive a set of bits indicating received signaling information 850 for the set of configured decoding candidates for the downlink control channel. The decoding component 830 may determine (or receive) input LLRs for the decoding candidates based on the received signaling information 850 and may use the input LLRs to perform a list decoding process for the decoding candidates. The decoding component 830 may pass decoded DCI 865 to other components of the device 805 for processing. In some cases, the decoding component 830 may pass the decoded DCI 865 (or other information based on the decoded DCI 865) to the transmitter 835.

The transmitter 835 may transmit signals 870 generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas. The transmitter 835 may receive information (e.g., such as decoded DCI 865 or other information based on the decoded DCI 865) for transmission and may identify time-frequency resources over which the information is to be transmitted. The transmitter 835 may modulate the information over the identified time-frequency resources in order to transmit the signal 870.

Figure 9:
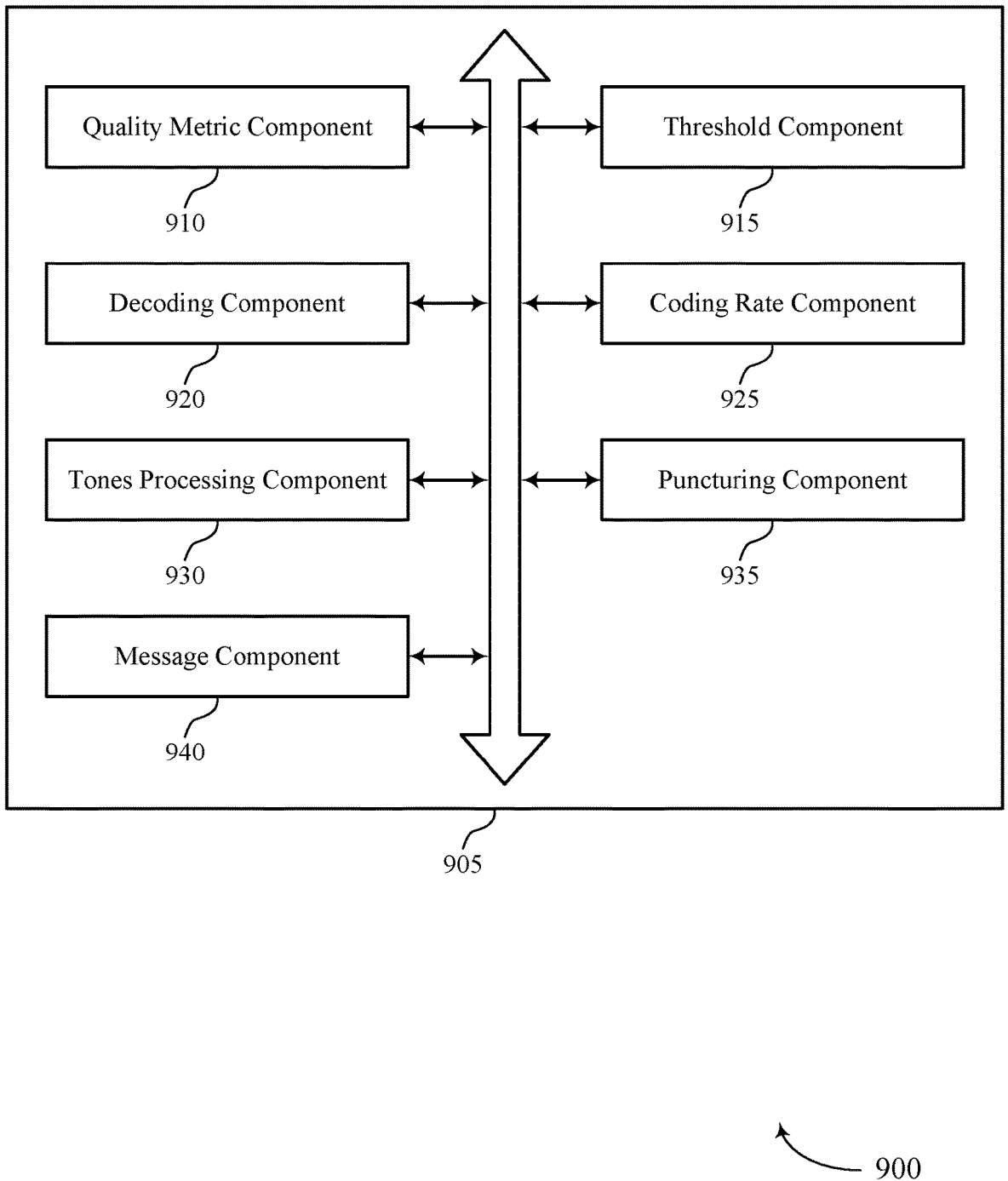
FIG. 9 shows a block diagram of a communications manager that supports low power downlink control channel monitoring in accordance with aspects of the present disclosure.

FIG. 9 shows a block diagram 900 of a communications manager 905 that supports low power downlink control channel monitoring in accordance with aspects of the present disclosure. The communications manager 905 may be an example of aspects of a communications manager 715, a communications manager 815, or a communications manager 1010 described herein. The communications manager 905 may include a quality metric component 910, a threshold component 915, a decoding component 920, a coding rate component 925, a tones processing component 930, a puncturing component 935, a message component 940, or some combination thereof. Each of these modules may communicate, directly or indirectly, with one another (e.g., via one or more buses). In some cases, the communications manager 905 may be implemented at a UE.

The quality metric component 910 may perform a measurement of resources associated with a downlink control channel to obtain a quality metric for the downlink control channel. In some cases, the quality metric is based on a channel estimation for resource elements of the downlink control channel, a noise covariance of the resource elements of the downlink control channel, a set of resource elements in a decoding candidate for the decoding process, or a combination thereof. In some cases, the quality metric includes an SNR for the downlink control channel, a SINR for the downlink control channel, a spectral efficiency for the downlink control channel, or a combination thereof.

The threshold component 915 may compare the quality metric to one or more thresholds. The decoding component 920 may perform a decoding process on one or more of a set of configured decoding candidates for the downlink control channel based on a result of the comparing.

In some examples, the one or more thresholds may include a first set of thresholds for a first aggregation level including a first subset of the set of configured decoding candidates and the decoding component 920 may perform a first decoding process for the first subset of the set of configured decoding candidates based on comparing the quality metric to the first set of one or more quality metric thresholds for the first aggregation level.

In some examples, the quality metric may include a first quality metric and the threshold component 915 may compare a second quality metric to a second set of thresholds for a second aggregation level including a second subset of the set of configured decoding candidates (e.g., where the second aggregation level is associated with a different code rate than the first aggregation level). As described herein, a "first" aggregation level and a "second" aggregation level may refer to any two different aggregation levels supported by the system. Furthermore, the threshold component 915 may compare the first quality metric and/or the second quality metric to any number of thresholds for any number of aggregation levels (e.g., five aggregation levels in some wireless communications systems). In some such examples, the decoding component 920 may perform a second decoding process for the second subset of the set of configured decoding candidates based on comparing the quality metric to the second set of thresholds for the second aggregation level. In some cases, the first quality metric is the same as the second quality metric. In some other cases, the first quality metric is different from the second quality metric. In some cases, a first list size of a channel decoder, a first number of iterations of the channel decoder, or a combination thereof for the first decoding process for the first aggregation level are different from a second list size of the channel decoder, a second number of iterations of the channel decoder, or a combination thereof for the second decoding process for the second aggregation level. In some other such examples, the decoding component 920 may refrain from performing a second decoding process for the second subset of the set of configured decoding candidates based on comparing the quality metric to the second set of thresholds for the second aggregation level. In some cases, the quality metric fails to satisfy each threshold of the second set of thresholds for the second aggregation level.

In some examples, performing the decoding process involves performing the decoding process during a first monitoring occasion. In some examples, the quality metric component 910 may perform, during a second monitoring occasion, an additional measurement of the resources associated with the downlink control channel to obtain an additional quality metric for the downlink control channel. The threshold component 915 may compare the additional quality metric to the one or more thresholds to obtain an additional result. In some such examples, the decoding component 920 may refrain from performing an additional decoding process on the set of configured decoding candidates for the downlink control channel based on the additional result. In some cases, the additional quality metric may fail to satisfy each threshold of the one or more thresholds.

In some examples, the decoding component 920 may perform, using a channel decoder, a list decoding process for the downlink control channel using a maximum list size supported by the UE for the channel decoder based on the result of the comparing.

The coding rate component 925 may select a coding rate for the decoding process based on the result of the comparing. In some cases, the one or more thresholds include multiple thresholds, and the coding rate is selected from a set of supported coding rates based on the result of the comparing the quality metric to the multiple thresholds. The tones processing component 930 may refrain from processing one or more resource elements of the downlink control channel according to the selected coding rate. The puncturing component 935 may puncture symbol information for the downlink control channel associated with the one or more resource elements, where the decoding process is performed on the punctured symbol information. In some cases, the puncturing is performed according to a puncturing pattern for the selected coding rate. An advantage of puncturing the set of LLRs corresponding to the one or more tones may include reducing the processing overhead for the device, which may result in power savings, among other advantages.

In some cases, if performing a first decoding process for a first aggregation level and a second decoding process for a second aggregation level, the coding rate component 925 may select a coding rate for the first decoding process and the second decoding process based on comparing the first quality metric to the first set of thresholds for the first aggregation level, comparing the second quality metric to the second set of thresholds for the second aggregation level, or both. The tones processing component 930 may refrain from processing a first set of resource elements of the downlink control channel for the first aggregation level based on comparing the first quality metric to the first set of thresholds and may refrain from processing a second set of resource elements of the downlink control channel for the second aggregation level based on comparing the second quality metric to the second set of thresholds. The puncturing component 935 may achieve the selected coding rate (e.g., achieve the coding rate selection) by puncturing first symbols information for the downlink control channel associated with the first set of resource elements for the first aggregation level, where the first decoding process is performed on the punctured first symbols information, and may puncture second symbols information for the downlink control channel associated with the second set of resource elements for the second aggregation level, where the second decoding process is performed on the punctured second symbols information different from the punctured first symbols information.

The message component 940 may receive, via the downlink control channel, a DCI message conforming to a second puncturing pattern different from the first puncturing pattern. In some examples, the decoding component 920 may fail to decode the DCI message based on puncturing the symbol information according to the first puncturing pattern and the DCI message conforming to the second puncturing pattern.

In some examples, the decoding component 920 may select a list size for a channel decoder that is less than a maximum list size supported by the UE for the channel decoder based on the result of the comparing. In some such examples, the decoding component 920 may perform, using the channel decoder, a list decoding process for the downlink control channel using the selected list size. In some examples, the selected list size is one, and the message component 940 may receive, via the downlink control channel, a distorted DCI message, where the distorted DCI message includes an inverted encoded bit for a most reliable bit for polar decoding of the distorted DCI message. In some such examples, the decoding component 920 may fail to decode the distorted DCI message based on performing the list decoding process using the selected list size of one and the distorted DCI message including the inverted encoded bit for the most reliable bit for polar decoding.

The tones processing component 930 may process one or more pilot tones of the downlink control channel. In some examples, the tones processing component 930 may obtain the quality metric based on processing the one or more pilot tones.

Figure 10:
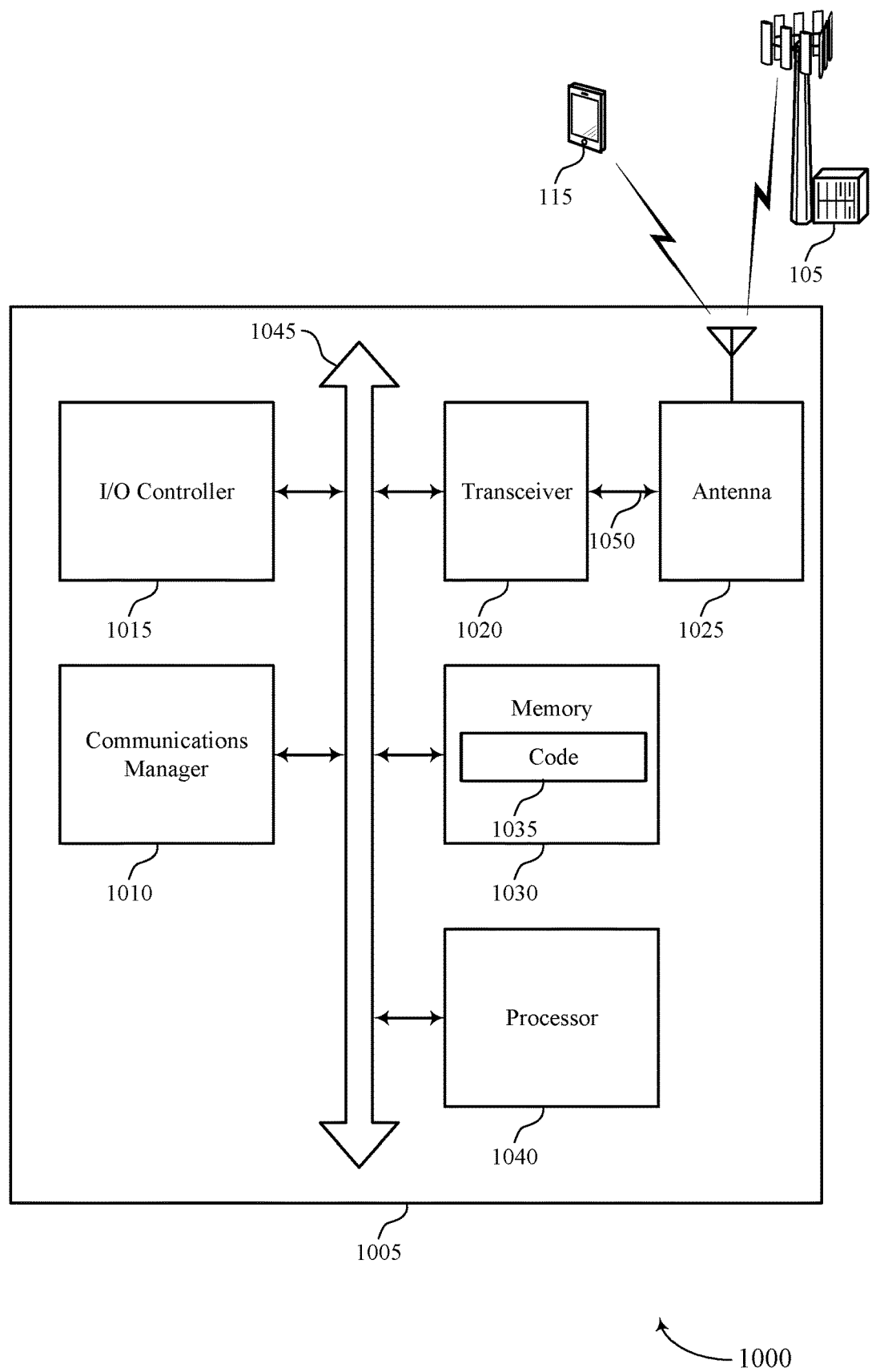
FIG. 10 shows a diagram of a system including a device that supports low power downlink control channel monitoring in accordance with aspects of the present disclosure.

FIG. 10 shows a diagram of a system 1000 including a device 1005 that supports low power downlink control channel monitoring in accordance with aspects of the present disclosure. The device 1005 may be an example of or include the components of a device 705, a device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may measure a quality metric based on channel conditions for a downlink control channel, compare the quality metric to one or more thresholds, and perform a decoding process on one or more configured decoding candidates for the downlink control channel based on the comparing.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets (e.g., as information 1050) to the antennas for transmission, and to demodulate packets received from the antennas (e.g., as information 1050).

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting low power downlink control channel monitoring).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
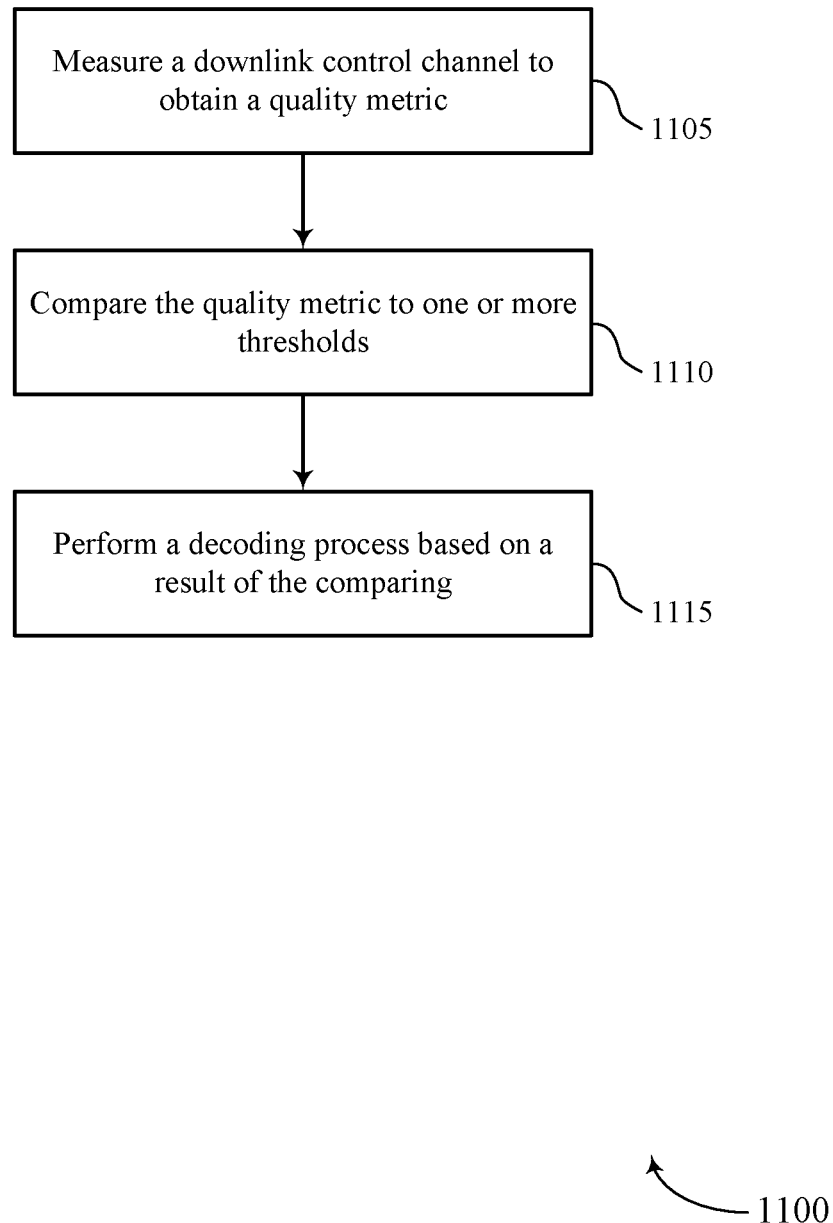
FIGS. 11 through 13 show flowcharts illustrating methods that support low power downlink control channel monitoring in accordance with aspects of the present disclosure.

FIG. 11 shows a flowchart illustrating a method 1100 that supports low power downlink control channel monitoring in accordance with aspects of the present disclosure. The operations of method 1100 may be implemented by a UE 115 or its components as described herein. For example, the operations of method 1100 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1105, the UE may perform a measurement of resources associated with a downlink control channel to obtain a quality metric for the downlink control channel. For example, the UE may perform measurement procedures for a channel (e.g., pilot tone processing) such as channel estimation, noise covariance estimation, SNR estimation, etc. The UE may generate the quality metric based on the measurements. The operations of 1105 may be performed according to the methods described herein. In some examples, aspects of the operations of 1105 may be performed by a quality metric component as described with reference to FIGS. 7 through 10.

At 1110, the UE may compare the quality metric to one or more thresholds. For example, the UE may determine that the quality metric satisfies and/or fails to satisfy at least one of the quality metric thresholds by comparing a quantity of the quality metric with a quantity of a threshold. The one or more thresholds may be stored in memory at the UE. The operations of 1110 may be performed according to the methods described herein. In some examples, aspects of the operations of 1110 may be performed by a threshold component as described with reference to FIGS. 7 through 10.

At 1115, the UE may perform a decoding process on one or more of a set of configured decoding candidates for the downlink control channel based on a result of the comparing. For example, the UE may perform a decoding procedure (e.g., a polar decoding procedure as described with reference to FIG. 5) by demodulating information received from a base station 115 via a decoding candidate (e.g., DCI sent over a PDCCH search space) and decoding the demodulated information to obtain a set of decoded bits. The operations of 1115 may be performed according to the methods described herein. In some examples, aspects of the operations of 1115 may be performed by a decoding component as described with reference to FIGS. 7 through 10.

Figure 12:
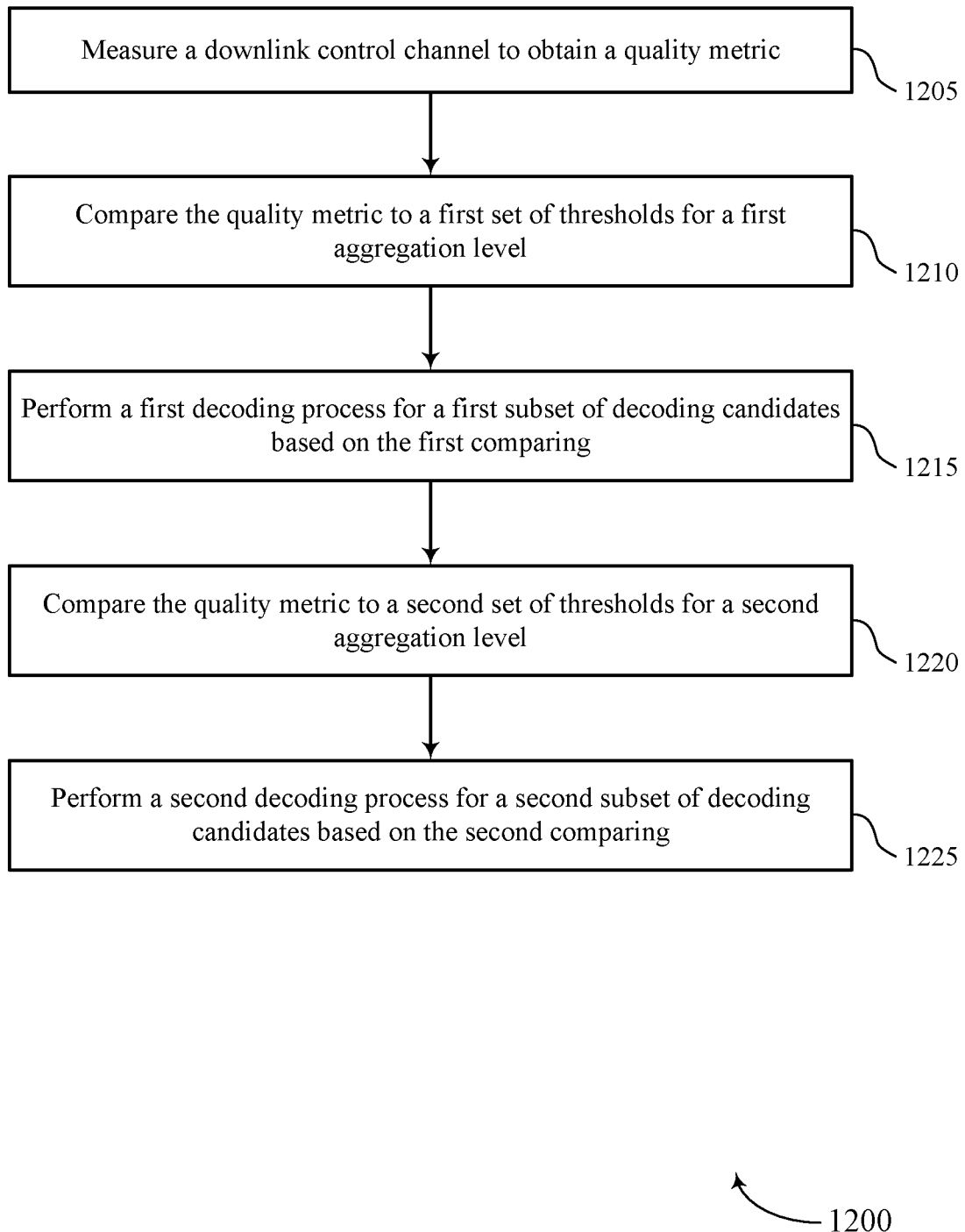

FIG. 12 shows a flowchart illustrating a method 1200 that supports low power downlink control channel monitoring in accordance with aspects of the present disclosure. The operations of method 1200 may be implemented by a UE 115 or its components as described herein. For example, the operations of method 1200 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1205, the UE may perform a measurement of resources associated with a downlink control channel to obtain a quality metric for the downlink control channel. For example, the UE may perform measurement procedures for a channel (e.g., pilot tone processing) such as channel estimation, noise covariance estimation, SNR estimation, etc. The UE may generate the quality metric based on the measurements. The operations of 1205 may be performed according to the methods described herein. In some examples, aspects of the operations of 1205 may be performed by a quality metric component as described with reference to FIGS. 7 through 10.

At 1210, the UE may compare the quality metric to a first set of thresholds for a first aggregation level including a first subset of the set of configured decoding candidates. For example, the UE may determine that the quality metric satisfies and/or fails to satisfy at least one of the quality metric thresholds by comparing a quantity of the quality metric with a quantity of a threshold. The UE may store the first set of thresholds associated with the first aggregation level in memory. The operations of 1210 may be performed according to the methods described herein. In some examples, aspects of the operations of 1210 may be performed by a threshold component as described with reference to FIGS. 7 through 10.

At 1215, the UE may perform a first decoding process for the first subset of the set of configured decoding candidates based on comparing the quality metric to the first set of thresholds. For example, the UE may perform a decoding procedure (e.g., a polar decoding procedure as described with reference to FIG. 5) by demodulating information received from a base station 115 via a decoding candidate (e.g., DCI sent over a PDCCH search space) and decoding the demodulated information using a list decoder. In some cases, the UE may refrain from processing some data tones and puncture LLRs according to a determined coding rate for the decoding process. The UE may demodulate and determine a set of decoded bits (e.g., information bits corresponding to DCI) based on input LLRs. The operations of 1215 may be performed according to the methods described herein. In some examples, aspects of the operations of 1215 may be performed by a decoding component as described with reference to FIGS. 7 through 10.

At 1220, the UE may additionally compare the quality metric to a second set of thresholds for a second aggregation level including a second subset of the set of configured decoding candidates, where the second aggregation level is associated with a different code rate than the first aggregation level. For example, the UE may determine that the quality metric satisfies and/or fails to satisfy at least one of the quality metric thresholds associated with the second aggregation level and/or the code rate associated with the second aggregation level. The UE may store the second set of thresholds associated with the second aggregation level in memory. The operations of 1220 may be performed according to the methods described herein. In some examples, aspects of the operations of 1220 may be performed by a threshold component as described with reference to FIGS. 7 through 10.

At 1225, the UE may perform a second decoding process for the second aggregation level of the downlink control channel based on comparing the quality metric to the second set of thresholds for the second aggregation level. For example, the UE may perform a decoding procedure (e.g., a polar decoding procedure as described with reference to FIG. 5) by demodulating information received from a base station 115 via a decoding candidate (e.g., DCI sent over a PDCCH search space) and decoding the demodulated information using a list decoder. In some cases, the UE may refrain from processing some data tones and puncture LLRs according to a determined coding rate and/or thresholds of the second aggregation level. The UE may demodulate and determine a set of decoded bits (e.g., information bits corresponding to DCI) based on input LLRs. The operations of 1225 may be performed according to the methods described herein. In some examples, aspects of the operations of 1225 may be performed by a decoding component as described with reference to FIGS. 7 through 10.

Figure 13:
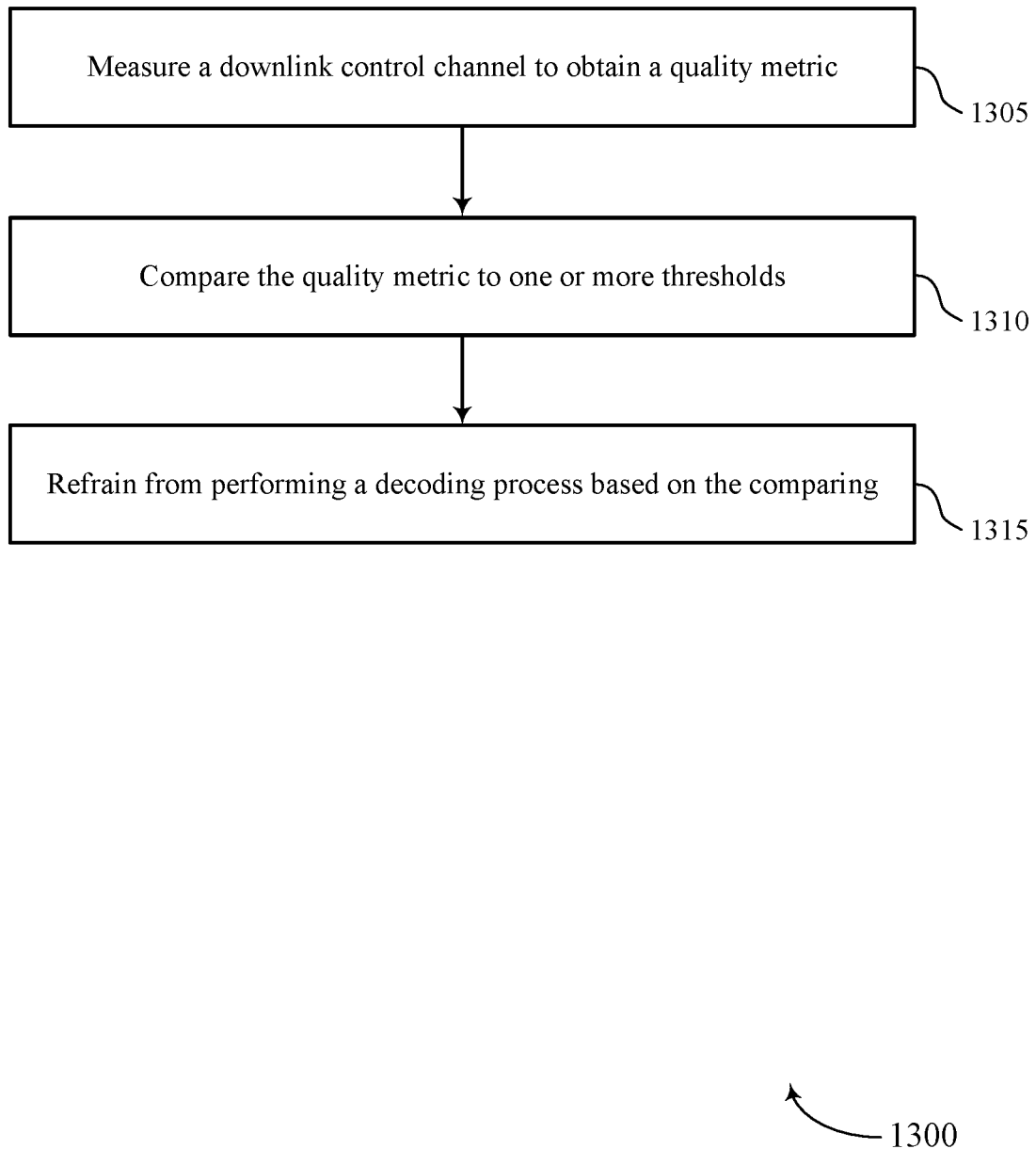

FIG. 13 shows a flowchart illustrating a method 1300 that supports low power downlink control channel monitoring in accordance with aspects of the present disclosure. The operations of method 1300 may be implemented by a UE 115 or its components as described herein. For example, the operations of method 1300 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1305, the UE may perform a measurement of resources associated with a downlink control channel to obtain a quality metric for the downlink control channel. For example, the UE may perform measurement procedures for a channel (e.g., pilot tone processing) such as channel estimation, noise covariance estimation, SNR estimation, etc. The UE may generate a quality metric based on the measurements. The operations of 1305 may be performed according to the methods described herein. In some examples, aspects of the operations of 1305 may be performed by a quality metric component as described with reference to FIGS. 7 through 10.

At 1310, the UE may compare the quality metric to one or more thresholds. For example, the UE may determine that the quality metric satisfies and/or fails to satisfy at least one of the quality metric thresholds by comparing a value of the quality metric with a value of a threshold. The operations of 1310 may be performed according to the methods described herein. In some examples, aspects of the operations of 1310 may be performed by a threshold component as described with reference to FIGS. 7 through 10.

At 1315, the UE may refrain from performing a decoding process based on the comparing. For example, the UE may determine that the channel conditions are relatively poor based on the comparing (e.g., the quality metric is less than each of the thresholds) and may power down radio components used for decoding one or more of a set of configured decoding candidates. The operations of 1315 may be performed according to the methods described herein. In some examples, aspects of the operations of 1315 may be performed by a decoding component as described with reference to FIGS. 7 through 10.

Described below are a number of embodiments of methods, systems or apparatuses including means for implementing methods or realizing apparatuses, non-transitory computer-readable medium storing instructions executable by one or more processors to cause the one or more processors to implement methods, and systems including one or more processors and memory coupled with the one or more processors storing instructions executable by the one or more processors to cause the system or apparatus to implement methods. It is to be understood that these are just some examples of possible embodiments, and other examples will be readily apparent to those skilled in the art without departing from the scope of the disclosure.

Embodiment 1: A method for wireless communications at a UE, comprising: performing a measurement of resources associated with a downlink control channel to obtain a quality metric for the downlink control channel; comparing the quality metric to one or more thresholds; and performing a decoding process on one or more of a plurality of configured decoding candidates for the downlink control channel based at least in part on a result of the comparing.

Embodiment 2: The method of embodiment 1, wherein the one or more thresholds comprise a first set of thresholds for a first aggregation level comprising a first subset of the plurality of configured decoding candidates and performing the decoding process comprises: performing a first decoding process for the first subset of the plurality of configured decoding candidates based at least in part on comparing the quality metric to the first set of thresholds for the first aggregation level.

Embodiment 3: The method of embodiment 2, wherein the quality metric comprises a first quality metric, the method further comprising: comparing a second quality metric to a second set of thresholds for a second aggregation level comprising a second subset of the plurality of configured decoding candidates, wherein the second quality metric is obtained based at least in part on performing the measurement of resources associated with the downlink control channel; and performing a second decoding process for the second subset of the plurality of configured decoding candidates based at least in part on comparing the second quality metric to the second set of thresholds for the second aggregation level.

Embodiment 4: The method of embodiment 3, wherein the first quality metric is the same as the second quality metric.

Embodiment 5: The method of either of embodiments 3 or 4, wherein a first list size of a channel decoder, a first number of iterations of the channel decoder, or a combination thereof for the first decoding process for the first aggregation level are different from a second list size of the channel decoder, a second number of iterations of the channel decoder, or a combination thereof for the second decoding process for the second aggregation level.

Embodiment 6: The method of any of embodiments 3 to 5, further comprising: selecting a coding rate for the first decoding process and the second decoding process based at least in part on comparing the first quality metric to the first set of thresholds for the first aggregation level, comparing the second quality metric to the second set of thresholds for the second aggregation level, or both; refraining from processing a first set of resource elements of the downlink control channel for the first aggregation level based at least in part on comparing the first quality metric to the first set of thresholds, wherein the selected coding rate is achieved by puncturing first symbols information for the downlink control channel associated with the first set of resource elements for the first aggregation level, wherein the first decoding process is performed on the punctured first symbols information; and refraining from processing a second set of resource elements of the downlink control channel for the second aggregation level based at least in part on comparing the second quality metric to the second set of thresholds, wherein the selected coding rate is achieved by puncturing second symbols information for the downlink control channel associated with the second set of resource elements for the second aggregation level, wherein the second decoding process is performed on the punctured second symbols information.

Embodiment 7: The method of any of embodiments 2 to 6, wherein the quality metric comprises a first quality metric, the method further comprising: comparing a second quality metric to a second set of thresholds for a second aggregation level comprising a second subset of the plurality of configured decoding candidates, wherein the second quality metric is obtained based at least in part on performing the measurement of resources associated with the downlink control channel; and refraining from performing a second decoding process for the second subset of the plurality of configured decoding candidates based at least in part on comparing the second quality metric to the second set of thresholds for the second aggregation level.

Embodiment 8: The method of embodiment 7, wherein the second quality metric fails to satisfy each threshold of the second set of thresholds for the second aggregation level.

Embodiment 9: The method of any of embodiments 1 to 8, wherein performing the measurement of resources associated with the downlink control channel is performed during a first monitoring occasion, the method further comprising: performing, during a second monitoring occasion, an additional measurement of the resources associated with the downlink control channel to obtain an additional quality metric for the downlink control channel; comparing the additional quality metric to the one or more thresholds to obtain an additional result; and refraining from performing an additional decoding process on the plurality of configured decoding candidates for the downlink control channel based at least in part on the additional result.

Embodiment 10: The method of embodiment 9, wherein the additional quality metric fails to satisfy each threshold of the one or more thresholds.

Embodiment 11: The method of any of embodiments 1 to 10, wherein performing the decoding process comprises: performing, using a channel decoder, a list decoding process for the downlink control channel using a maximum list size supported by the UE for the channel decoder based at least in part on the result of the comparing.

Embodiment 12: The method of any of embodiments 1 to 11, wherein performing the decoding process comprises: selecting a coding rate for the decoding process based at least in part on the result of the comparing; refraining from processing one or more resource elements of the downlink control channel according to the selected coding rate; and puncturing symbol information for the downlink control channel associated with the one or more resource elements, wherein the decoding process is performed on the punctured symbol information.

Embodiment 13: The method of embodiment 12, wherein the one or more thresholds comprise a plurality of thresholds, and wherein the coding rate is selected from a plurality of supported coding rates based at least in part on the result of comparing the quality metric to the plurality of thresholds.

Embodiment 14: The method of either of embodiments 12 or 13, wherein the puncturing is performed according to a puncturing pattern for the selected coding rate.

Embodiment 15: The method of embodiment 14, wherein the puncturing pattern comprises a first puncturing pattern, the method further comprising: receiving, via the downlink control channel, a DCI message conforming to a second puncturing pattern different from the first puncturing pattern; and failing to decode the DCI message based at least in part on puncturing the symbol information according to the first puncturing pattern and the DCI message conforming to the second puncturing pattern.

Embodiment 16: The method of any of embodiments 1 to 10 or 12 to 15, wherein performing the decoding process comprises: selecting a list size for a channel decoder that is less than a maximum list size supported by the UE for the channel decoder based at least in part on the result of the comparing; and performing, using the channel decoder, a list decoding process for the downlink control channel using the selected list size.

Embodiment 17: The method of embodiment 16, wherein the selected list size is one, the method further comprising: receiving, via the downlink control channel, a distorted downlink control information message, wherein the distorted downlink control information message comprises an inverted encoded bit for a most reliable bit for polar decoding of the distorted downlink control information message; and failing to decode the distorted downlink control information message based at least in part on performing the list decoding process using the selected list size of one and the distorted downlink control information message comprising the inverted encoded bit for the most reliable bit for polar decoding.

Embodiment 18: The method of any of embodiments 1 to 17, wherein the quality metric is based at least in part on a channel estimation for resource elements of the downlink control channel, a noise covariance of the resource elements of the downlink control channel, a set of resource elements in a decoding candidate for the decoding process, or a combination thereof.

Embodiment 19: The method of any of embodiments 1 to 18, wherein the quality metric comprises a signal-to-noise ratio for the downlink control channel, a signal-to-interference-plus-noise ratio for the downlink control channel, a spectral efficiency for the downlink control channel, or a combination thereof.

Embodiment 20: The method of any of embodiments 1 to 19, further comprising: processing one or more pilot tones of the downlink control channel, wherein the quality metric is obtained based at least in part on processing the one or more pilot tones.

Embodiment 21: An apparatus comprising at least one means for performing a method of any of embodiments 1 to 20.

Embodiment 22: An apparatus for wireless communications comprising: a processor; memory coupled with the processor; and instructions stored in the memory and executable by the processor to cause the apparatus to perform a method of any of embodiments 1 to 20.

Embodiment 23: A non-transitory computer-readable medium storing code for wireless communications, the code comprising instructions executable by a processor to perform a method of any of embodiments 1 to 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
performing a measurement of one or more signals associated with a downlink control channel to obtain a quality metric for the downlink control channel, the quality metric indicating channel conditions of the downlink control channel based at least in part on the measurement of the one or more signals, wherein a plurality of decoding candidates for the downlink control channel are mapped to a plurality of aggregation levels, and wherein a coding rate for a decoding process is selected based at least in part on comparing the quality metric to one or more thresholds for each of the plurality of aggregation levels; and
performing the decoding process on one or more of the plurality of decoding candidates based at least in part on a result of the comparing, wherein the decoding process comprises a first partial decoding process on a first decoding candidate of a first aggregation level based at least in part on the result of the comparing being a first result and a second partial decoding process on a second decoding candidate of a second aggregation level based at least in part on the result of the comparing being a second result, and wherein the first partial decoding process comprises refraining from processing a first quantity of resource elements of the downlink control channel and the second partial decoding process comprises refraining from processing a second quantity of resource elements that is different from the first quantity of resource elements.

2. The method of claim 1, wherein the one or more thresholds comprise a first plurality of thresholds for the first aggregation level comprising a first subset of the plurality of decoding candidates and performing the decoding process comprises:
performing a first decoding process for the first subset of the plurality of decoding candidates based at least in part on comparing the quality metric to the first plurality of thresholds for the first aggregation level.

3. The method of claim 2, wherein the quality metric comprises a first quality metric, the method further comprising:
comparing a second quality metric to a second plurality of thresholds for the second aggregation level comprising a second subset of the plurality of decoding candidates, wherein the second quality metric is obtained based at least in part on performing the measurement of the one or more signals associated with the downlink control channel; and
performing a second decoding process for the second subset of the plurality of decoding candidates based at least in part on comparing the second quality metric to the second plurality of thresholds for the second aggregation level.

4. The method of claim 3, wherein the first quality metric is the same as the second quality metric.

5. The method of claim 3, wherein a first list size of a channel decoder, a first number of iterations of the channel decoder, or a combination thereof for the first decoding process for the first aggregation level are different from a second list size of the channel decoder, a second number of iterations of the channel decoder, or a combination thereof for the second decoding process for the second aggregation level.

6. The method of claim 3, further comprising:
selecting the coding rate for the first decoding process and the second decoding process based at least in part on comparing the first quality metric to the first plurality of thresholds for the first aggregation level, comparing the second quality metric to the second plurality of thresholds for the second aggregation level, or both;
refraining from processing the first quantity of resource elements of the downlink control channel for the first aggregation level based at least in part on comparing the first quality metric to the first plurality of thresholds, wherein the selected coding rate is achieved by puncturing first symbols information for the downlink control channel associated with the first quantity of resource elements for the first aggregation level, wherein the first decoding process is performed on the punctured first symbols information; and
refraining from processing the second quantity of resource elements of the downlink control channel for the second aggregation level based at least in part on comparing the second quality metric to the second plurality of thresholds, wherein the selected coding rate is achieved by puncturing second symbols information for the downlink control channel associated with the second set quantity of resource elements for the second aggregation level, wherein the second decoding process is performed on the punctured second symbols information.

7. The method of claim 2, wherein the quality metric comprises a first quality metric, the method further comprising:
comparing a second quality metric to a second plurality of thresholds for the second aggregation level comprising a second subset of the plurality of decoding candidates, wherein the second quality metric is obtained based at least in part on performing the measurement of the one or more signals associated with the downlink control channel; and
refraining from performing a second decoding process for the second subset of the plurality of decoding candidates based at least in part on comparing the second quality metric to the second plurality of thresholds for the second aggregation level.

8. The method of claim 7, wherein the second quality metric fails to satisfy each threshold of the second plurality of thresholds for the second aggregation level.

9. The method of claim 1, wherein the measurement of the one or more signals associated with the downlink control channel is performed during a first monitoring occasion, the method further comprising:
performing, during a second monitoring occasion, an additional measurement of the one or more signals associated with the downlink control channel to obtain an additional quality metric for the downlink control channel;

comparing the additional quality metric to the one or more thresholds to obtain an additional result; and refraining from performing an additional decoding process on the plurality of decoding candidates for the downlink control channel based at least in part on the additional result.

10. The method of claim 9, wherein the additional quality metric fails to satisfy each threshold of the one or more thresholds.

11. The method of claim 1, wherein performing the decoding process comprises:

performing, using a channel decoder, a list decoding process for the downlink control channel using a maximum list size supported by the UE for the channel decoder based at least in part on the result of the comparing.

12. The method of claim 1, wherein performing the decoding process comprises:

selecting the coding rate for the decoding process based at least in part on the result of the comparing;

refraining from processing one or more resource elements of the downlink control channel according to the selected coding rate; and puncturing symbol information for the downlink control channel associated with the one or more resource elements, wherein the decoding process is performed on the punctured symbol information.

13. The method of claim 12, wherein the one or more thresholds comprise a plurality of thresholds, and wherein the coding rate is selected from a plurality of supported coding rates based at least in part on the result of comparing the quality metric to the plurality of thresholds.

14. The method of claim 12, wherein the puncturing is performed according to a puncturing pattern for the selected coding rate.

15. The method of claim 14, wherein the puncturing pattern comprises a first puncturing pattern, the method further comprising:

receiving, via the downlink control channel, a downlink control information message conforming to a second puncturing pattern different from the first puncturing pattern; and failing to decode the downlink control information message based at least in part on puncturing the symbol information according to the first puncturing pattern and the downlink control information message conforming to the second puncturing pattern.

16. The method of claim 1, wherein performing the decoding process comprises:

selecting a list size for a channel decoder that is less than a maximum list size supported by the UE for the channel decoder based at least in part on the result of the comparing; and performing, using the channel decoder, a list decoding process for the downlink control channel using the selected list size.

17. The method of claim 16, wherein the selected list size is one, the method further comprising:

receiving, via the downlink control channel, a distorted downlink control information message, wherein the distorted downlink control information message comprises an inverted encoded bit for a most reliable bit for polar decoding of the distorted downlink control information message; and failing to decode the distorted downlink control information message based at least in part on performing the list decoding process using the selected list size of one and the distorted downlink control information message comprising the inverted encoded bit for the most reliable bit for the polar decoding.

18. The method of claim 1, wherein the quality metric is based at least in part on a channel estimation of the downlink control channel associated with the one or more signals, the channel estimation associated with resource elements of the downlink control channel associated with the one or more signals, a noise covariance of the resource elements of the downlink control channel associated with the one or more signals, a set of resource elements in a decoding candidate for the decoding process, or a combination thereof.

19. The method of claim 1, wherein the quality metric comprises a signal-to-noise ratio for the one or more signals associated with the downlink control channel, a signal-to-interference-plus-noise ratio for the one or more signals associated with the downlink control channel, a spectral efficiency for the one or more signals associated with the downlink control channel, or a combination thereof.

20. The method of claim 1, further comprising:

processing one or more pilot tones of the downlink control channel, wherein the quality metric is obtained based at least in part on processing the one or more pilot tones.

21. An apparatus for wireless communications at a user equipment (UE), comprising:

a processor;

memory coupled with the processor; and instructions stored in the memory and executable by the processor to cause the apparatus to:

perform a measurement of one or more signals associated with a downlink control channel to obtain a quality metric for the downlink control channel, the quality metric indicating channel conditions of the downlink control channel based at least in part on the measurement of the one or more signals, wherein a plurality of decoding candidates for the downlink control channel are mapped to a plurality of aggregation levels, and wherein a coding rate for a decoding process is selected based at least in part on comparing the quality metric to one or more thresholds for each of the plurality of aggregation levels; and perform the decoding process on one or more of the plurality of decoding candidates based at least in part on a result of the comparing, wherein the decoding process comprises a first partial decoding process on a first decoding candidate of a first aggregation level based at least in part on the result of the comparing being a first result and a full second partial decoding process on a second decoding candidate of a second aggregation level based at least in part on the result of the comparing being a second result, and wherein the first partial decoding process comprises refraining from processing a first quantity of resource elements of the downlink control channel and the second partial decoding process comprises refraining from processing a second quantity of resource elements that is different from the first quantity of resource elements.

22. The apparatus of claim 21, wherein the one or more thresholds comprise a first set of thresholds for the first aggregation level comprising a first subset of the plurality of decoding candidates and the instructions to perform the decoding process are further executable by the processor to cause the apparatus to:

perform a first decoding process for the first subset of the plurality of decoding candidates based at least in part on comparing the quality metric to the first set of thresholds for the first aggregation level.

23. The apparatus of claim 22, wherein the quality metric comprises a first quality metric and the instructions are further executable by the processor to cause the apparatus to:

compare a second quality metric to a second set of thresholds for the second aggregation level comprising a second subset of the plurality of decoding candidates, wherein the second quality metric is obtained based at least in part on performing the measurement of the one or more signals associated with the downlink control channel; and perform a second decoding process for the second subset of the plurality of decoding candidates based at least in part on comparing the second quality metric to the second set of thresholds for the second aggregation level.

24. The apparatus of claim 22, wherein the quality metric comprises a first quality metric and the instructions are further executable by the processor to cause the apparatus to:

compare a second quality metric to a second set thresholds for the second aggregation level comprising a second subset of the plurality of decoding candidates, wherein the second quality metric is obtained based at least in part on performing the measurement of the one or more signals associated with the downlink control channel; and refrain from performing a second decoding process for the second subset of the plurality of decoding candidates based at least in part on comparing the second quality metric to the second set of thresholds for the second aggregation level.

25. The apparatus of claim 21, wherein the instructions to perform the decoding process are further executable by the processor to cause the apparatus to:

perform, using a channel decoder, a list decoding process for the downlink control channel using a maximum list size supported by the apparatus for the channel decoder based at least in part on the comparing.

26. The apparatus of claim 21, wherein the instructions to perform the decoding process are further executable by the processor to cause the apparatus to:

select the coding rate for the decoding process based at least in part on the result of the comparing;
refrain from processing one or more resource elements of the downlink control channel according to the selected coding rate; and
puncture symbol information for the downlink control channel associated with the one or more resource elements, where the decoding process is performed on the punctured symbol information.

27. The apparatus of claim 21, wherein the instructions to perform the decoding process are further executable by the processor to cause the apparatus to:

select a list size for a channel decoder that is less than a maximum list size supported by the apparatus for the channel decoder based at least in part on the result of the comparing; and
perform, using the channel decoder, a list decoding process for the downlink control channel using the selected list size.

28. The apparatus of claim 21, wherein the instructions are further executable by the processor to cause the apparatus to:

process one or more pilot tones of the downlink control channel, wherein the quality metric is obtained based at least in part on processing the one or more pilot tones.

29. An apparatus for wireless communications at a user equipment (UE), comprising:

means for performing a measurement of one or more signals associated with a downlink control channel to obtain a quality metric for the downlink control channel, the quality metric indicating channel conditions of the downlink control channel based at least in part on the measurement of the one or more signals, wherein a plurality of decoding candidates for the downlink control channel are mapped to a plurality of aggregation levels, and wherein a coding rate for a decoding process is selected based at least in part on comparing the quality metric to one or more thresholds for each of the plurality of aggregation levels; and means for performing the decoding process on one or more of the plurality of decoding candidates based at least in part on a result of the comparing, wherein the decoding process comprises first a partial decoding process on a first decoding candidate of a first aggregation level based at least in part on the result of the comparing being a first result and a second partial decoding process on a second decoding candidate of a second aggregation level based at least in part on the result of the comparing being a second result, and wherein the first partial decoding process comprises refraining from processing a first quantity of resource elements of the downlink control channel and the second partial decoding process comprises refraining from processing a second quantity of resource elements that is different from the first quantity of resource elements.

30. A non-transitory computer-readable medium storing code for wireless communications at a user equipment (UE), the code comprising instructions executable by a processor to:

perform a measurement of one or more signals associated with a downlink control channel to obtain a quality metric for the downlink control channel, the quality metric indicating channel conditions of the downlink control channel based at least in part on the measurement of the one or more signals, wherein a plurality of decoding candidates for the downlink control channel are mapped to a plurality of aggregation levels, and wherein a coding rate for a decoding process is selected based at least in part on comparing the quality metric to one or more thresholds for each of the plurality of aggregation levels; and perform the decoding process on one or more of the plurality of decoding candidates for the downlink control channel based at least in part on a result of the comparing, wherein the decoding process comprises a first partial decoding process on a first decoding candidate of a first aggregation level based at least in part on the result of the comparing being a first result and a second partial decoding process on a second decoding candidate of a second aggregation level based at least in part on the result of the comparing being a second result, and wherein the first partial decoding process comprises refraining from processing a first quantity of resource elements of the downlink control channel and the second partial decoding process comprises refraining from processing a second quantity of resource elements that is different from the first quantity of resource elements.

* * * * *